US011153513B2

(12) United States Patent
Ivanov Bonev et al.

(10) Patent No.: US 11,153,513 B2
(45) Date of Patent: Oct. 19, 2021

(54) LIGHT SOURCE FOR CAMERA

(71) Applicant: Synaptics Incorporated, San Jose, CA (US)

(72) Inventors: Boyan Ivanov Bonev, Santa Clara, CA (US); Marek Mienko, Santa Clara, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/544,488

(22) Filed: Aug. 19, 2019

(65) Prior Publication Data
US 2021/0058568 A1     Feb. 25, 2021

(51) Int. Cl.
*H04N 5/33*     (2006.01)
*H04N 5/00*     (2011.01)
*H04N 5/225*    (2006.01)

(52) U.S. Cl.
CPC ............. *H04N 5/33* (2013.01); *H04N 5/2254* (2013.01)

(58) Field of Classification Search
CPC combination set(s) only.
See application file for complete search history.

(56) References Cited

U.S. PATENT DOCUMENTS

| | | | |
|---|---|---|---|
| 5,667,474 A | 9/1997 | Nishimura | |
| 6,798,406 B1 | 9/2004 | Jones et al. | |
| 7,239,909 B2 | 7/2007 | Zeman | |
| 8,937,646 B1 | 1/2015 | Baldwin | |
| 9,188,662 B2 | 11/2015 | You et al. | |
| 9,317,243 B2 | 4/2016 | Becze | |
| 9,377,623 B2 | 6/2016 | Robbins et al. | |
| 9,638,511 B2 | 5/2017 | Boppart et al. | |
| 9,953,214 B2 | 4/2018 | Yin et al. | |
| 9,977,960 B2 | 5/2018 | Gustafsson et al. | |
| 10,120,442 B2 | 11/2018 | Liu et al. | |
| 10,148,918 B1 | 12/2018 | Seiger et al. | |
| 10,491,885 B1 | 11/2019 | Hicks | |
| 10,606,349 B1 | 3/2020 | Ouderkirk et al. | |
| 2004/0263786 A1 | 12/2004 | Williams et al. | |
| 2006/0010400 A1* | 1/2006 | Dehlin | G06F 3/0421 715/856 |

(Continued)

FOREIGN PATENT DOCUMENTS

| | | |
|---|---|---|
| CN | 105094307 A | 11/2015 |
| CN | 109188711 A | 1/2019 |

(Continued)

OTHER PUBLICATIONS

International Search Report and Written Opinion dated Sep. 3, 2020, issued in International Application No. PCT/US2020/034301, filed May 22, 2020, 11 pages.

(Continued)

*Primary Examiner* — Jeffery A Williams
(74) *Attorney, Agent, or Firm* — Paradice & Li LLP

(57) ABSTRACT

A device comprises a first camera, wherein the first camera includes one or more photosensors configured to detect visible light passing, in a first direction, through a first surface. The device further includes a light source configured to emit infrared (IR) light, in a second direction opposite the first direction, through the first surface. The device also includes a second camera configured to detect reflections of the IR light.

23 Claims, 19 Drawing Sheets

(56) References Cited

U.S. PATENT DOCUMENTS

| | | | |
|---|---|---|---|
| 2007/0057211 A1* | 3/2007 | Bahlman | G01N 21/6486 |
| | | | 250/584 |
| 2008/0106628 A1 | 5/2008 | Cok et al. | |
| 2009/0141116 A1 | 6/2009 | Kanade et al. | |
| 2012/0026325 A1 | 2/2012 | Bunker et al. | |
| 2012/0032875 A1* | 2/2012 | Sprowl | G06F 3/0304 |
| | | | 345/156 |
| 2012/0169669 A1 | 7/2012 | Lee et al. | |
| 2012/0229610 A1 | 9/2012 | Fukushima et al. | |
| 2012/0249724 A1 | 10/2012 | Morrison | |
| 2013/0016256 A1 | 1/2013 | Yahagi et al. | |
| 2013/0033593 A1 | 2/2013 | Chinnock et al. | |
| 2014/0055978 A1 | 2/2014 | Gantz et al. | |
| 2015/0163400 A1 | 6/2015 | Geiss et al. | |
| 2015/0253931 A1 | 9/2015 | Wyrwas et al. | |
| 2015/0304627 A1 | 10/2015 | Sheikh Faridul et al. | |
| 2015/0310253 A1 | 10/2015 | Agrawal et al. | |
| 2016/0041384 A1 | 2/2016 | Robbins et al. | |
| 2016/0116944 A1 | 4/2016 | Lee et al. | |
| 2016/0117860 A1* | 4/2016 | Fei | G06K 9/00147 |
| | | | 345/419 |
| 2016/0180591 A1* | 6/2016 | Shiu | G06F 3/013 |
| | | | 345/633 |
| 2016/0309134 A1 | 10/2016 | Venkataraman et al. | |
| 2016/0335778 A1 | 11/2016 | Smits | |
| 2017/0038597 A1 | 2/2017 | Li et al. | |
| 2017/0069097 A1 | 3/2017 | Molgaard et al. | |
| 2017/0094141 A1* | 3/2017 | Hicks | H04N 9/07 |
| 2017/0131766 A1 | 5/2017 | He et al. | |
| 2017/0154570 A1 | 6/2017 | Suh et al. | |
| 2017/0192499 A1 | 7/2017 | Trail | |
| 2017/0220838 A1* | 8/2017 | He | G06F 3/042 |
| 2017/0220844 A1* | 8/2017 | Jones | G06F 3/0421 |
| 2017/0243373 A1 | 8/2017 | Bevensee et al. | |
| 2017/0272731 A1 | 9/2017 | Kashyap | |
| 2018/0068430 A1 | 3/2018 | Sang et al. | |
| 2018/0139431 A1 | 5/2018 | Simek et al. | |
| 2018/0157908 A1 | 6/2018 | Sahlsten et al. | |
| 2018/0197482 A1 | 7/2018 | Choi et al. | |
| 2018/0198980 A1 | 7/2018 | Takagi et al. | |
| 2018/0300589 A1 | 10/2018 | Levinshtein et al. | |
| 2018/0332205 A1 | 11/2018 | Hawthrone et al. | |
| 2018/0338049 A1 | 11/2018 | Wachi | |
| 2019/0132570 A1 | 5/2019 | Chen et al. | |
| 2019/0158713 A1 | 5/2019 | McMillan et al. | |
| 2019/0164522 A1 | 5/2019 | Bonnier et al. | |
| 2019/0294108 A1 | 9/2019 | Ozcan et al. | |
| 2019/0318677 A1 | 10/2019 | Lu et al. | |
| 2019/0333233 A1 | 10/2019 | Hu et al. | |
| 2020/0099920 A1* | 3/2020 | Khamis | H04N 13/271 |
| 2020/0195764 A1 | 6/2020 | Xu et al. | |
| 2020/0265206 A1* | 8/2020 | Chung | G06K 9/0004 |
| 2020/0389575 A1 | 12/2020 | Gove | |

FOREIGN PATENT DOCUMENTS

| | | |
|---|---|---|
| WO | 2017/052766 A1 | 3/2017 |
| WO | 2017/161520 A1 | 9/2017 |
| WO | 2018/049201 A1 | 3/2018 |
| WO | 2019045750 A1 | 3/2019 |

OTHER PUBLICATIONS

International Search Report and Written Opinion dated Sep. 9, 2020, issued in International Application No. PCT/US2020/035761, filed Jun. 2, 2020, 12 pages.

International Search Report and Written Opinion dated Feb. 24, 2021, issued in International Application No. PCT/US2020/059367, filed Nov. 6, 2020, 11 pages.

Kim et al., "Under-Display Image Sensor for Eye Tracking," U.S. Appl. No. 16/704,523, filed Dec. 5, 2019.

* cited by examiner

LIGHT SOURCE FOR CAMERA

TECHNICAL FIELD

The present embodiments relate generally to light sources for cameras.

BACKGROUND OF RELATED ART

Some electronic devices such as smartphones, tablets, laptops and other computing systems include a camera and display. The camera is often disposed within a region of the device that provides an unobstructed view of the environment. Thus, when integrated on the same surface as the display, the camera may be disposed adjacent to the display, within a large, unsightly black border around the display, or within a notch or cutout.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a device comprising a first camera, wherein the first camera includes one or more photosensors configured to detect visible light passing, in a first direction, through a first surface. The device may further include a light source configured to emit-infrared (IR) light, in a second direction opposite the first direction, through the first surface. The device may also include a second camera configured to detect reflections of the IR light.

Another innovative aspect of the subject matter of this disclosure can be implemented in a camera assembly. The camera assembly may comprise a lens and one or more photosensors configured to detect visible light passing through the lens in a first direction. The camera assembly may further comprise a light source configured to emit light through the lens in a second direction opposite the first direction.

Another innovative aspect of the subject matter of this disclosure can be implemented in a camera assembly. The camera assembly may comprise one or more photosensors configured to detect visible light or IR light passing, in a first direction, through a first surface of the camera assembly. The camera assembly may further comprise a light source configured to emit light, in a second direction opposite the first direction, through the first surface. The camera assembly may also comprise a light guide configured to steer the light towards the first surface, wherein the first surface comprises at least a portion of the light guide.

BRIEF DESCRIPTION OF THE DRAWINGS

The present embodiments are illustrated by way of example and are not intended to be limited by the figures of the accompanying drawings.

DETAILED DESCRIPTION

Figure 1:
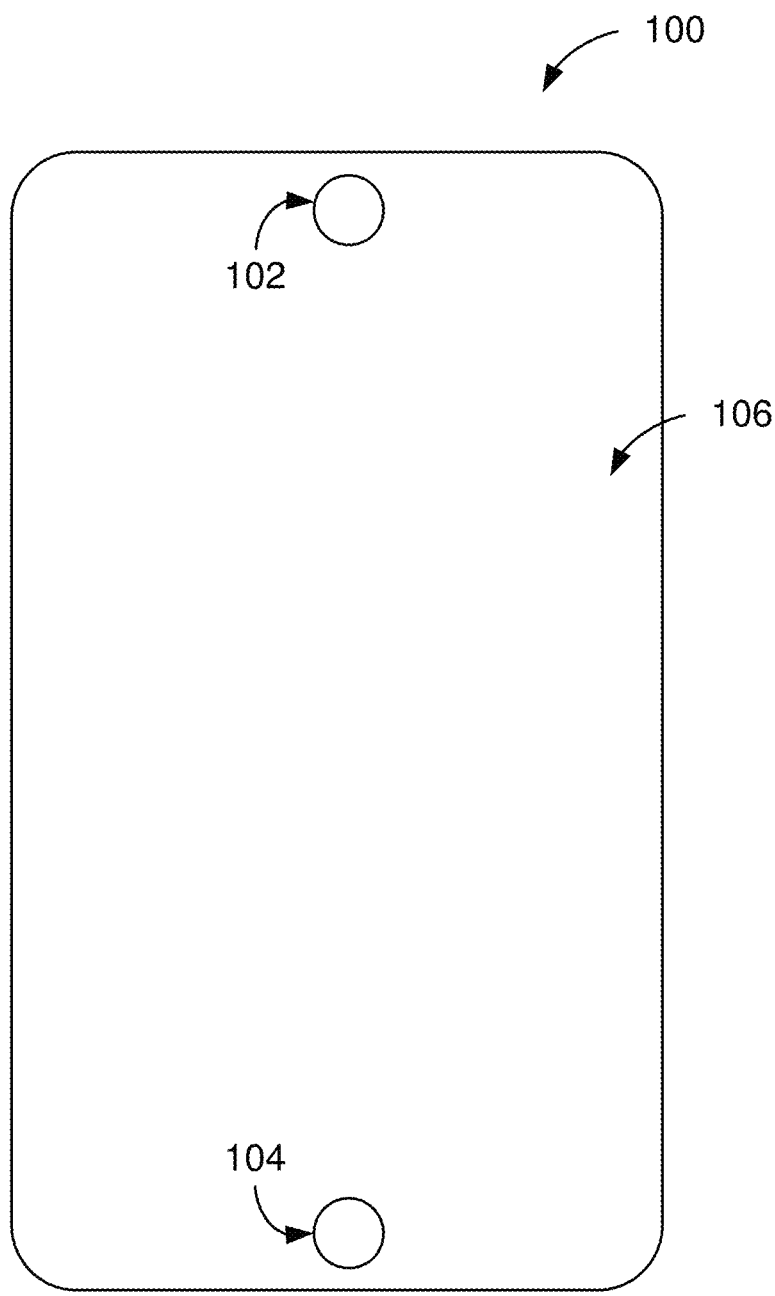
FIG. 1 shows an example electronic system, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), flash memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, and/or state machine capable of executing scripts or instructions of one or more software programs stored in memory.

FIG. 1 shows an example electronic system 100, in accordance with some embodiments. The electronic system 100 may include display 106 and cameras 102 and 104.

The display 106 may comprise a porous display, such as an organic light-emitting diode (OLED) display or a micro light-emitting diode (micro-LED) display, which contains holes or gaps between display pixels and/or display sub-pixels.

Each of the cameras 102 and 104 may comprise an array of active pixel sensors or photosensors (e.g., photodiodes, complementary metal oxide-semiconductor (CMOS) image sensor arrays, charge coupled device (CCD) arrays, and/or any other sensors capable of detecting wavelengths of light in the visible spectrum, the IR spectrum (e.g., NIR or short-wave IR), or the ultraviolet (UV) spectrum). In some embodiments, both of cameras 102 and 104 may be configured to detect NIR light. In other embodiments, one of the two cameras 102 and 104 may be configured to detect visible light (e.g., the red, green, and blue (RGB) color components of light) ("RGB camera") and the other camera may be configured to detect NIR light. Further, in some embodiments, each of the cameras 102 and 104 may be configured to support depth sensing. For example, each of the cameras 102 and 104 may be configured to capture an image of an object or scene in the field-of-view (FOV) of the cameras, the images may be combined, and depth information about the object or scene may be extracted from the combined images. The resolution of the depth sensing may depend on the distance of separation between the cameras 102 and 104. In other words, the greater the distance of separation, the greater the amount of depth information that can be derived from images captured by the cameras 102 and 104.

In some embodiments, one or both of the cameras 102 and 104 may be disposed behind the display 106. For example, when the camera 102 is disposed behind the display 106, the camera's FOV may be partially obstructed by pixels and/or sub-pixels of the display 106. As a result, when light passes through the display 106, some of the light may be occluded by the pixels and/or sub-pixels, while the remaining light may be detected by the camera 102. The camera 102 may capture this remaining light in an image, but the image may contain noise, distortion, or interference due to the occlusions. In some embodiments, a neural network model may be used to filter out this noise or interference so that the image is suitable for depth sensing and/or other image processing. Among other advantages, disposing the camera 102 behind the display 106 may eliminate the need for an unsightly black border, cutouts, or notches in the bezel of the display 106. In turn, the electronic system 100's screen-to-body ratio may be enhanced, and the electronic system 100 may support a bezel-less display.

In some embodiments, an under-display camera may require a light source in order to capture an image of an object or scene. Aspects of the disclosure provide camera assemblies (not shown in FIG. 1) configured to emit light for cameras such as under-display cameras, or cameras inside camera assemblies. As described further below, a camera assembly may comprise a lens, camera, and light source. Further, the camera assembly may be disposed adjacent to the display 106. In some embodiments, the camera assembly may further comprise a reflector configured to reflect light emitted from the light source through the lens. In other embodiments, the camera assembly may further include a light guide configured to steer light emitted by the light source through a first surface of the camera assembly.

Figure 2:
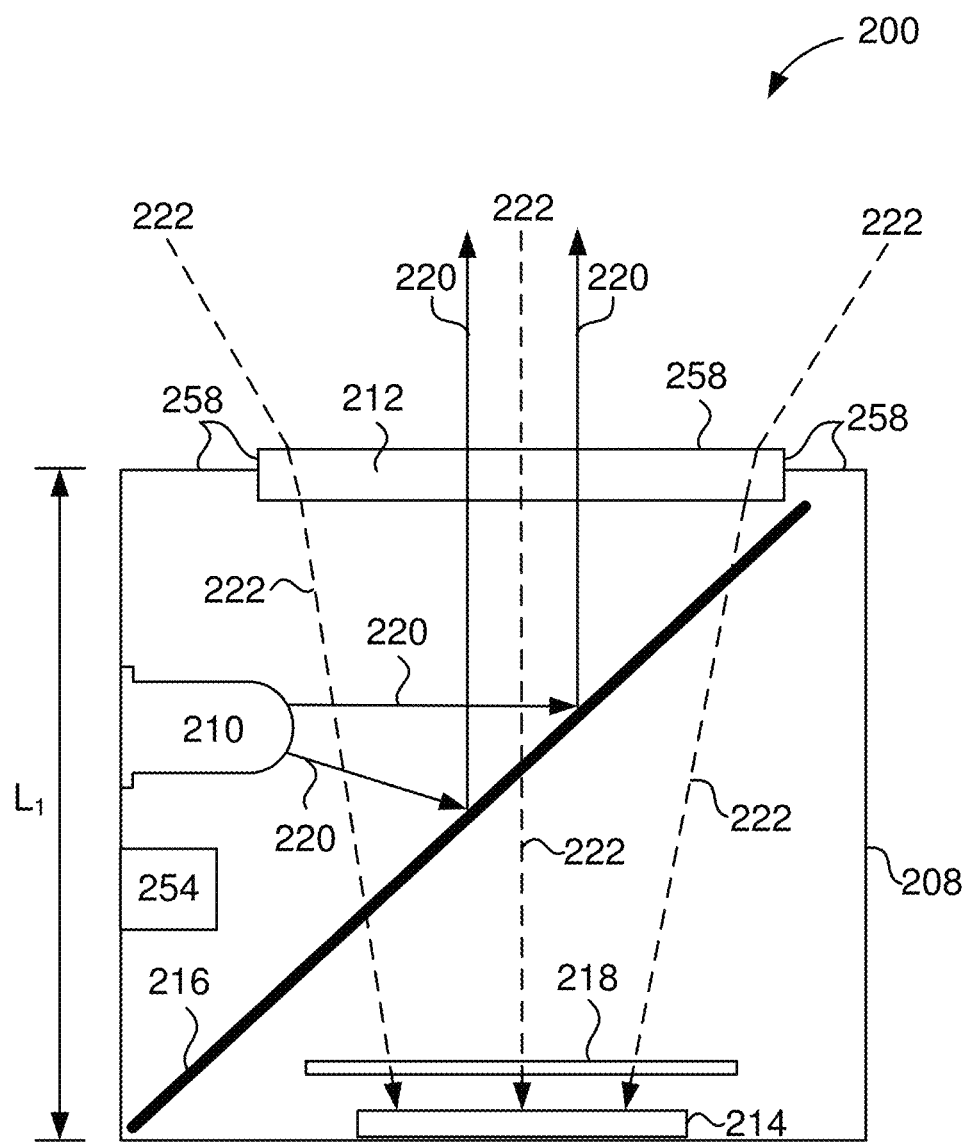
FIG. 2 shows an example camera assembly, in accordance with some embodiments.

FIG. 2 shows an example camera assembly 200, in accordance with some embodiments. The camera assembly 200 may include a light source 210, reflector 216, lens 212, camera 214, filter 218, proximity sensor 254, and housing 208.

The light source 210 is disposed inside the housing 208, to the side of the lens 212. The light source 210 may comprise a LED, a vertical-cavity surface-emitting laser (VCSEL), a laser diode, or other light source capable of emitting wavelengths of light in the IR spectrum including but not limited to NIR or short-wave infrared (SWIR).

The reflector 216 is configured to reflect IR light emitted by the light source 210 away from the camera 214, and to transmit visible light from the lens 212 to the camera 214. In some embodiments, the reflector 216 may comprise a reflective plane, dichroic reflector, and/or dichroic mirror. In other embodiments, the reflector 216 may comprise a beam splitter.

The lens 212 is an optical lens or assembly of lenses configured to transmit visible light and/or IR light. More specifically, the lens 212 may be configured to transmit visible light 222 from outside the camera assembly 200 to the camera 214, in an inward (or first) direction. In some aspects, the lens 212 may be configured to focus the visible light 222 onto the camera 214. The lens 212 may also be configured to transmit IR light 220 emitted by the light source 210 and reflected by the reflector 216. As shown in FIG. 2, the IR light 220 may travel in a direction opposite to that of the visible light 222, or in an outward (or second) direction, away from the camera assembly 200.

The camera 214 may comprise an array of active pixel sensors or photosensors (e.g., photodiodes, CMOS image sensor arrays, CCD arrays, and/or any other sensors capable of detecting wavelengths of light in the visible spectrum, the IR spectrum, or the UV spectrum). In some embodiments, the camera 214 may be a RGB camera. Further, the camera 214 may be configured to detect the visible light 222 while the light source 210 emits the IR light 220. Still further, the camera 214 may be configured to perform wide-range imaging, where an object or scene is imaged either close up or far away.

The filter 218 is disposed between the camera 214 and the lens 212. The filter 218 may comprise an IR cut filter. The filter 218 may be configured to reflect and/or block IR wavelengths of light (e.g., mid-IR wavelengths, NIR or SWIR), such that IR light does not interfere with the camera 214.

The proximity sensor 254 is disposed inside the housing 208, proximate to the light source 210. The proximity sensor 254 may comprise an array of active pixel sensors or photosensors (e.g., photodiodes, CMOS image sensor arrays, CCD arrays, and/or any other sensors capable of detecting wavelengths of light in the visible spectrum, the IR spectrum, or the UV spectrum). Further, the proximity sensor 254 may be configured to detect reflections of the IR light 220 emitted by the light source 210.

The housing 208 may comprise a structure that surrounds the lens 212 and encloses the light source 210, reflector 216, filter 218, and the camera 214. As shown in FIG. 2, a first surface 258 is formed by the top of the housing 208, the top of the lens 212, and part of the sides of the lens 212. Further, the length $L_1$ is the length of the housing 208, as measured from the top of the housing 208, at the first surface 258, to the base of the housing 208, near the camera 214. In some embodiments, it may be advantageous to minimize the length $L_1$ of the housing 208.

In some embodiments, during operation, the light source 210 may emit IR (e.g., NIR or SWIR) light 220, which reflects off the reflector 216 and passes through the lens 212 in an outward (or second) direction, away from the camera assembly 200. The IR light 220 may illuminate a scene in front of the camera assembly 200 and camera 214. Objects in the scene may reflect at least a portion of the IR light 220 back towards the camera assembly 200 and display disposed proximate to the camera assembly 200. Some of the reflected IR light 220 may be occluded by pixels and/or sub-pixels in the display, while the remainder of the reflected IR light 220 passes through holes between the display pixels and/or display sub-pixels. The reflected IR light 220 that passes through the holes may be detected by cameras configured to detect the reflected IR light 220 ("IR cameras"). Each of the IR cameras may capture the detected IR light 220 in an image, and the captured images may be suitable for depth sensing.

In other embodiments, during operation, the light source 210 may emit IR (e.g., NIR or SWIR) light 220, which reflects off the reflector 216 and passes through the lens 212 in an outward direction, away from the camera assembly 200. The IR light 220 may illuminate a scene in front of the camera assembly 200 and camera 214. Objects in the scene may reflect at least a portion of the IR light 220 back towards the camera assembly 200. The reflected IR light 220 may pass through the lens 212, reflect off the reflector 216, and be detected by the proximity sensor 254. Accordingly, the camera assembly 200 may be capable of emitting and sensing IR light in order to, for example, detect a user's presence.

Figure 3A:
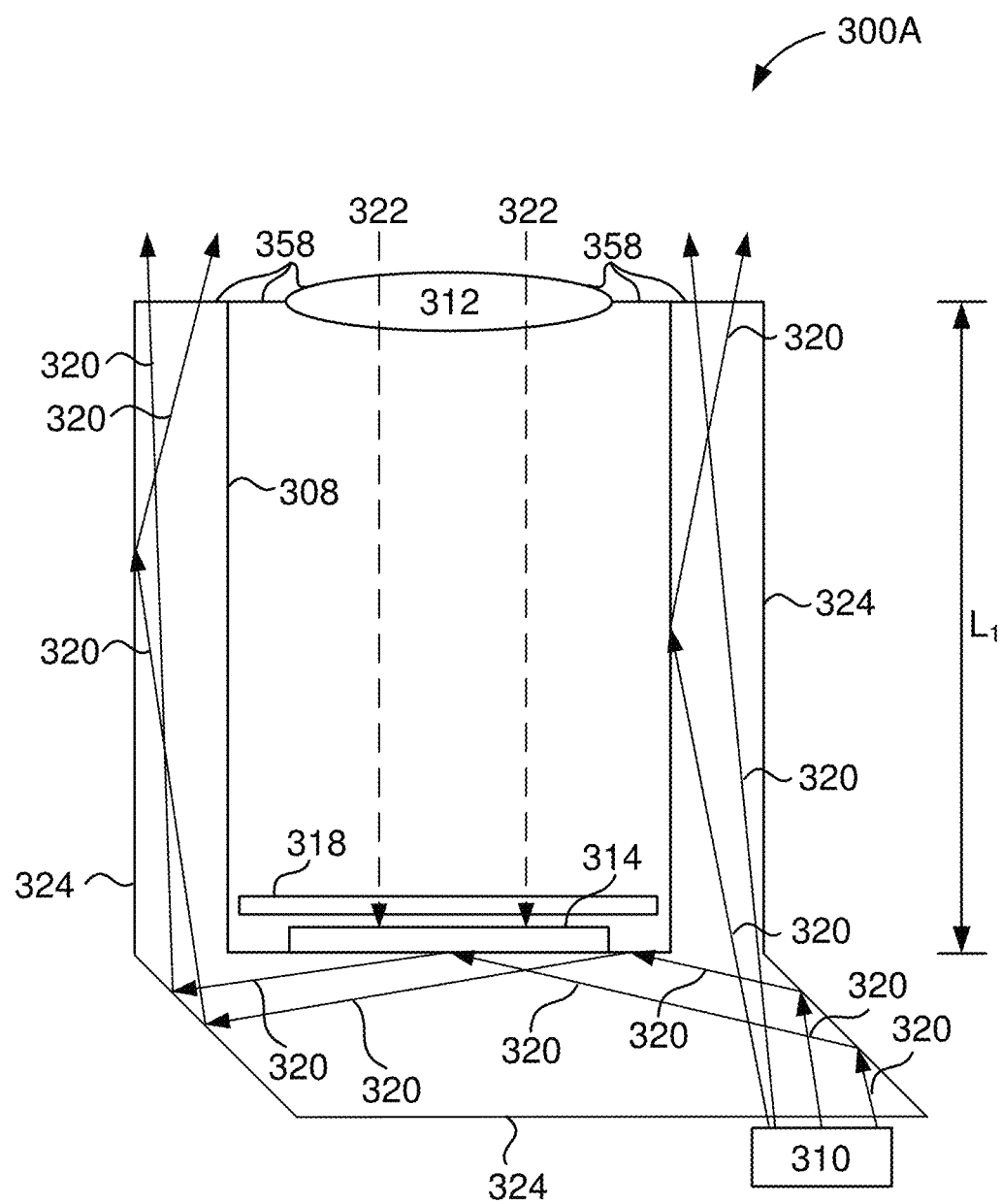
FIG. 3A shows an example camera assembly, in accordance with some embodiments.

FIG. 3A shows an example camera assembly 300A, in accordance with some embodiments. The camera assembly 300A may include the light source 310, light guide 324, housing 308, lens 312, filter 318, and camera 314.

The light source 310 may be coupled to the light guide 324 and configured to emit IR light 320. The light source 310 may comprise a LED, VCSEL, laser diode, or other light source capable of emitting wavelengths of light in the visible spectrum and/or the IR spectrum including but not limited to NIR or SWIR.

The light guide 324 may be configured to steer the IR light 320 emitted by the light source 310 in an outward (or second) direction, out of the camera assembly 300A. In some embodiments, the light guide 324 may comprise a transparent material such as transparent polycarbonate. Further, the light guide 324 may be configured to reflect light. For example, in some embodiments, the light guide 324 may be configured to reflect light where interior surfaces of the light guide 324 (which may include exterior surfaces of the housing 308) have a refractive index that is greater than a refractive index of interior surfaces of the housing 308. As another example, the light guide 324 may be configured to reflect light where interior surfaces of the light guide 324 (which may include exterior surfaces of the housing 308) comprise reflective surfaces while interior surfaces of the housing 308 comprise dark surfaces or surfaces capable of absorbing visible or IR (e.g., NIR and/or SWIR) light. In some embodiments, the light guide 324 may comprise optical fiber(s), and in other embodiments, the light guide 324 may comprise mirrors and/or reflectors. Further, the light guide 324 may be coupled (e.g., via molding) to the housing 308.

The lens 312 is an optical lens or assembly of lenses configured to transmit visible light 322 from outside the camera assembly 300A to the camera 314, in an inward (or first) direction. In some aspects, the lens 312 may be configured to focus the visible light 322 onto the camera 314. In some embodiments, the lens 312 may comprise acrylic.

The camera 314 may comprise an array of active pixel sensors or photosensors (e.g., photodiodes, CMOS image sensor arrays, CCD arrays, and/or any other sensors capable of detecting wavelengths of light in the visible spectrum, the IR spectrum (e.g., NIR or SWIR), or the UV spectrum). In some embodiments, the camera 314 may comprise a RGB camera. Further, the camera 314 may be configured to detect the visible light 322 while the light source 310 emits the IR light 320. Further, the camera 314 may be configured to perform wide-range imaging, where an object or scene is imaged either close up or far away.

The filter 318 is disposed between the camera 314 and the lens 312. The filter 318 may comprise an IR cut filter. The filter 318 may be configured to reflect and/or block IR wavelengths of light (e.g., mid-IR wavelengths, NIR, or SWIR light), such that IR light does not interfere with the camera 314.

The housing 308 surrounds the lens 312 and encloses the filter 318 and the camera 314. As noted above, interior surfaces (e.g., walls facing the camera 314) of the housing 308 may comprise dark surfaces or surfaces configured to absorb visible or IR (e.g., NIR and/or SWIR) light. As shown in FIG. 3A, a first surface 358 is formed by the top of the housing 308, the top of the lens 312, and a side of the light guide 324. Further, the length $L_1$ is the length of the housing 308, as measured from the top of the housing 308, at the first surface 358, to the base of the housing 308, near the camera 314. In some embodiments, it may be advantageous to minimize the length $L_1$ of the housing 308.

During operation, the light source 310 may emit IR (e.g., NIR or SWIR) light 320, which is steered through the light guide 324 and first surface 358. The IR light 320 may illuminate a scene in front of the camera assembly 300A and camera 314. Objects in the scene may reflect at least a portion of the IR light 320 back towards the camera assembly 300A and display disposed proximate to the camera assembly 300A. Some of the reflected IR light may pass through holes between pixels and/or sub-pixels of the display, and be detected by IR cameras disposed behind the display. Each of the IR cameras may capture the detected IR light in an image, and the captured images may be suitable for depth sensing.

With reference to FIG. 3A, in some embodiments, the light source 310 may be configured to emit the IR (e.g., NIR or SWIR) light 320, and the camera 314 may be configured to detect the IR light 320 and/or visible light 322. Further, in some embodiments, the light source 310 may be configured to emit the IR light 320 while the camera 314 detects the IR light 320 and/or the visible light 322. For example, during imaging, the light source 310 may emit the IR light 320, which is guided through the light guide 324 and first surface 358 to the front of the camera assembly 300A. Some of the IR light 320 may reflect off an object or feature in front of the camera assembly 300A, and pass through the lens 312 to the camera 314. Accordingly, the camera assembly 300A may be capable of emitting and sensing IR light for imaging In other embodiments, the light source 310 may be configured to emit visible light. During imaging, the light source 310 may emit visible light, which is guided through the light guide 324 and first surface 358 to the front of the camera assembly 300A. Some of the visible light may reflect off an object or feature in front of the camera assembly 300A, and then pass through the lens 312 to the camera 314. Accordingly, the camera assembly 300A may be capable of emitting and sensing visible light for imaging.

Figure 3B:
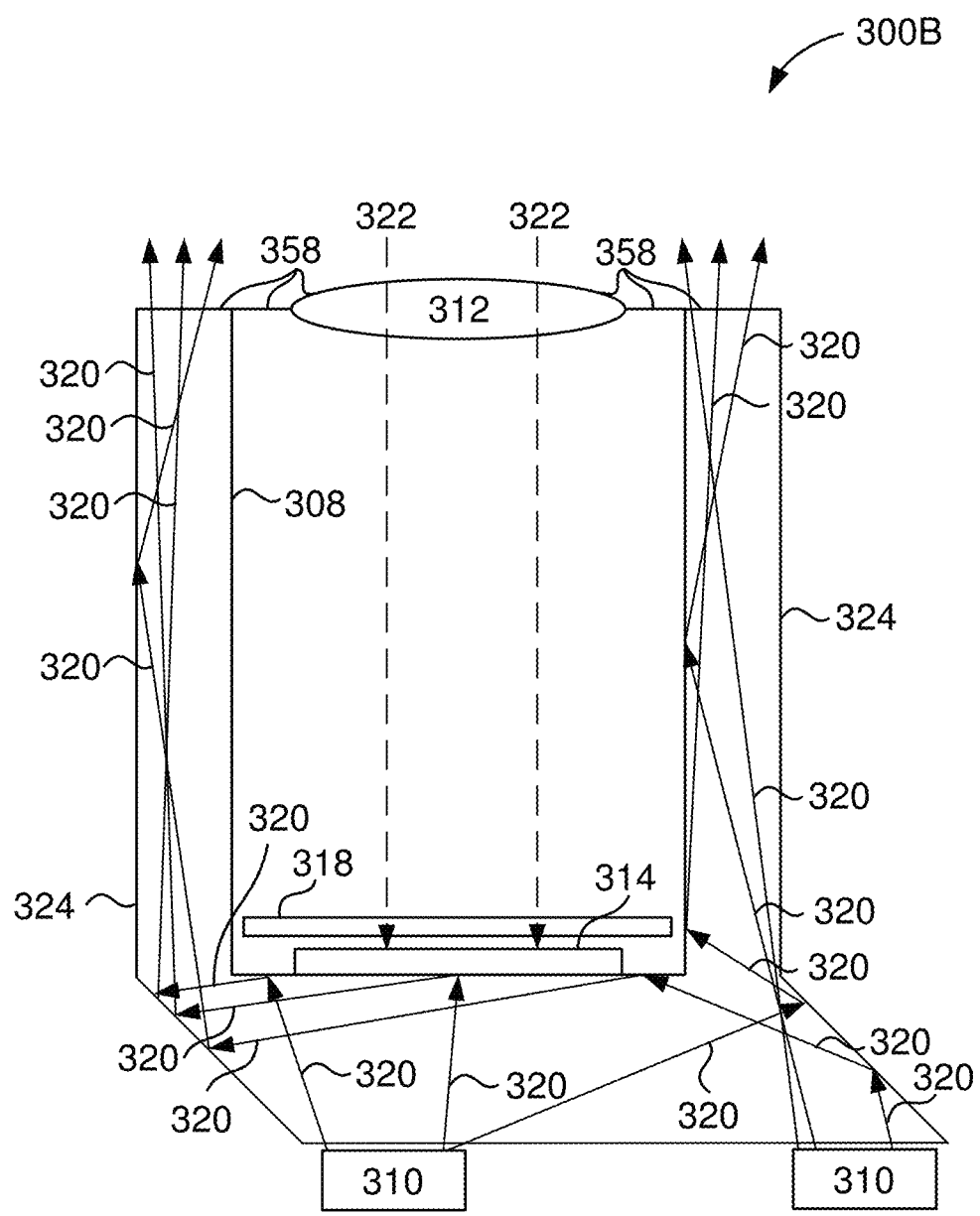
FIG. 3B shows an example camera assembly, in accordance with some embodiments.

FIG. 3B shows an example camera assembly 300B, in accordance with some embodiments. The camera assembly 300B may be an embodiment of the camera assembly 300A described above with reference to FIG. 3A. As shown in FIG. 3B, the camera assembly 300B includes two light sources 310, although in some embodiments, the camera assembly 300B may include more than two light sources. Each of the light sources 310 may be coupled to the light guide 324. Further, each of the light sources 310 may comprise a LED, VCSEL, laser diode, or other light source capable of emitting wavelengths of light in the IR spectrum including but not limited to NIR or SWIR. During operation, each of the light sources 310 may emit the IR light 320, which travels through the light guide 324 toward the front of the camera assembly 300B. As described above with reference to FIGS. 2 and 3A, the IR (e.g., NIR or SWIR) light 320 may reflect off objects or features in front of the camera assembly 300B, and be detected by under-display IR cameras for depth sensing and image processing.

Figure 3C:
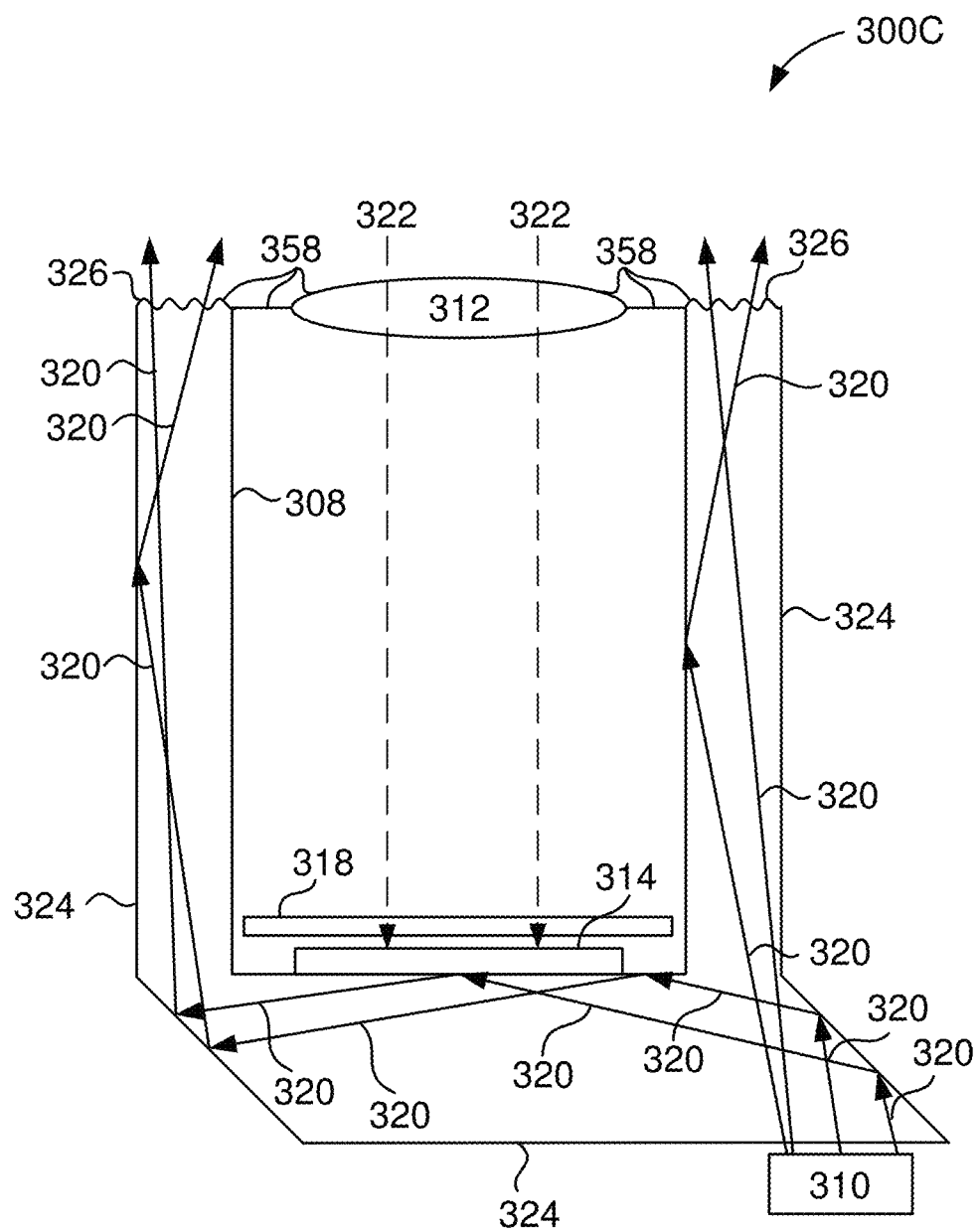
FIG. 3C shows an example camera assembly, in accordance with some embodiments.

FIG. 3C shows an example camera assembly 300C, in accordance with some embodiments. The camera assembly 300C may be an embodiment of the camera assembly 300A and/or 300B described above with reference to FIGS. 3A and 3B. As shown in FIG. 3C, the camera assembly 300C includes the camera 314, which may be capable of detecting wavelengths of light in the visible spectrum or the IR spectrum (e.g., NIR or SWIR). Further, the camera assembly 300C includes the light source 310, which may be capable of emitting wavelengths of light in the visible spectrum and/or the IR spectrum (e.g., NIR or SWIR).

As shown in FIG. 3C, the camera assembly 300C also includes the light guide 324. The light guide 324 comprises a diffuse surface 326, which may be configured to diffuse, spread, or scatter the light (e.g., visible, NIR, or SWIR) 320 emitted by the light source 310. The diffuse surface 326 may comprise a portion of the first surface 358 that forms a ring around the housing 308. Further, the diffuse surface 326 may comprise a portion of the light guide 324. For example, the diffuse surface 326 may be integrated with the light guide 324 via molding. In some embodiments, the diffuse surface 326 may comprise a diffractive grating with a certain roughness. More specifically, the diffractive grating may include a large number of fine grooves, slits, or ridges. In some embodiments, the grooves, slits and/or ridges may be positioned randomly, or they may be positioned in a parallel or uniform manner to form a pattern. Accordingly, the diffuse surface 326 may be configured to provide a uniform illumination profile or tailored illumination pattern of the light 320.

Figure 3D:
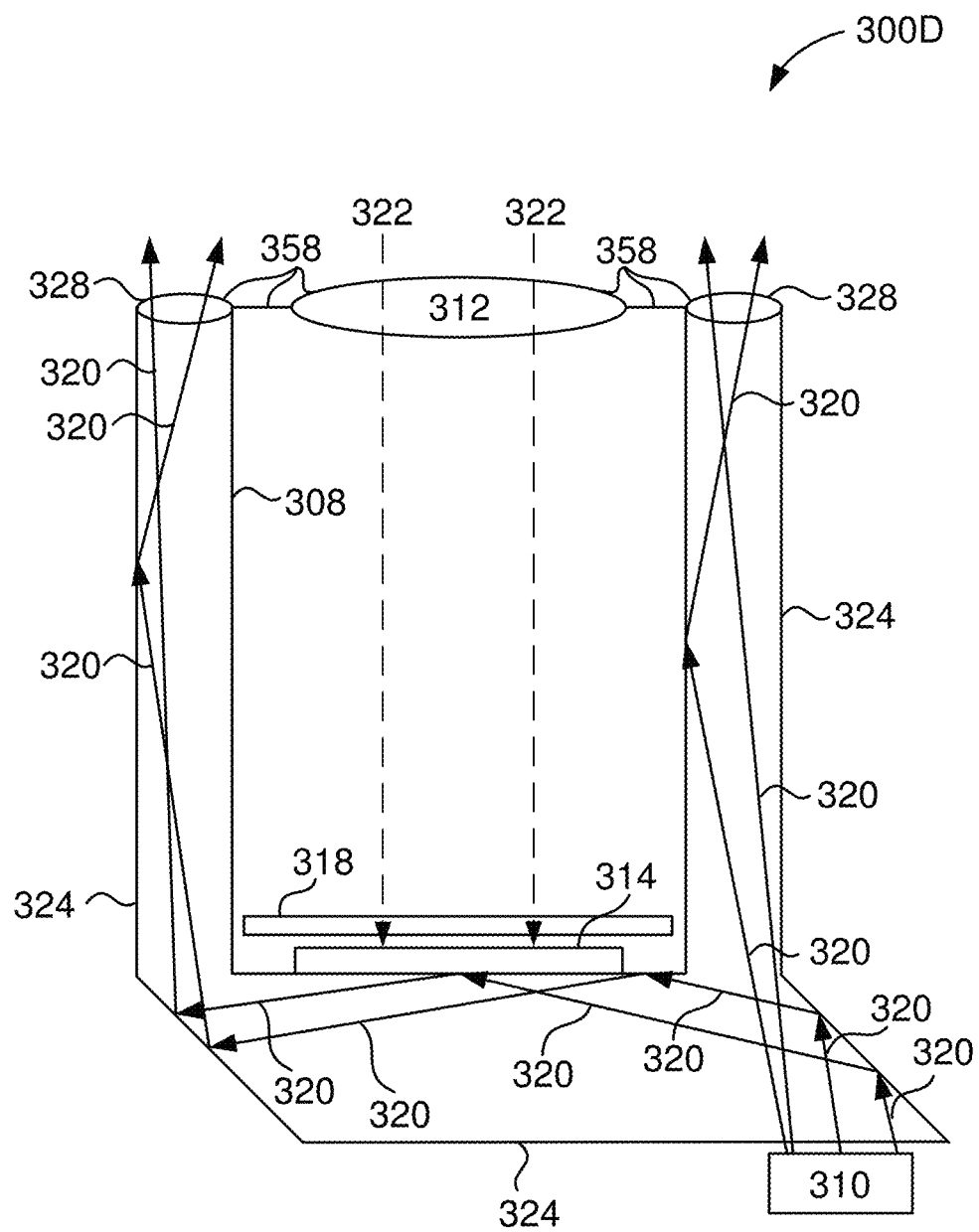
FIG. 3D shows an example camera assembly, in accordance with some embodiments.

FIG. 3D shows an example camera assembly 300D, in accordance with some embodiments. The camera assembly 300D may be an embodiment of the camera assembly 300A, 300B, and/or 300C described above with reference to FIGS. 3A, 3B and 3C. As shown in FIG. 3D, the light guide 324 includes lenses and/or micro-lenses 328 ("micro-lenses 328"). In some embodiments, a plurality of micro-lenses 328 may be integrated (e.g., molded) on a portion of the first surface 358 that forms a ring around the housing 308. The micro-lenses 328 may be configured to diffuse and/or diffract IR light 320 emitted by the light source 310.

Figure 3E:
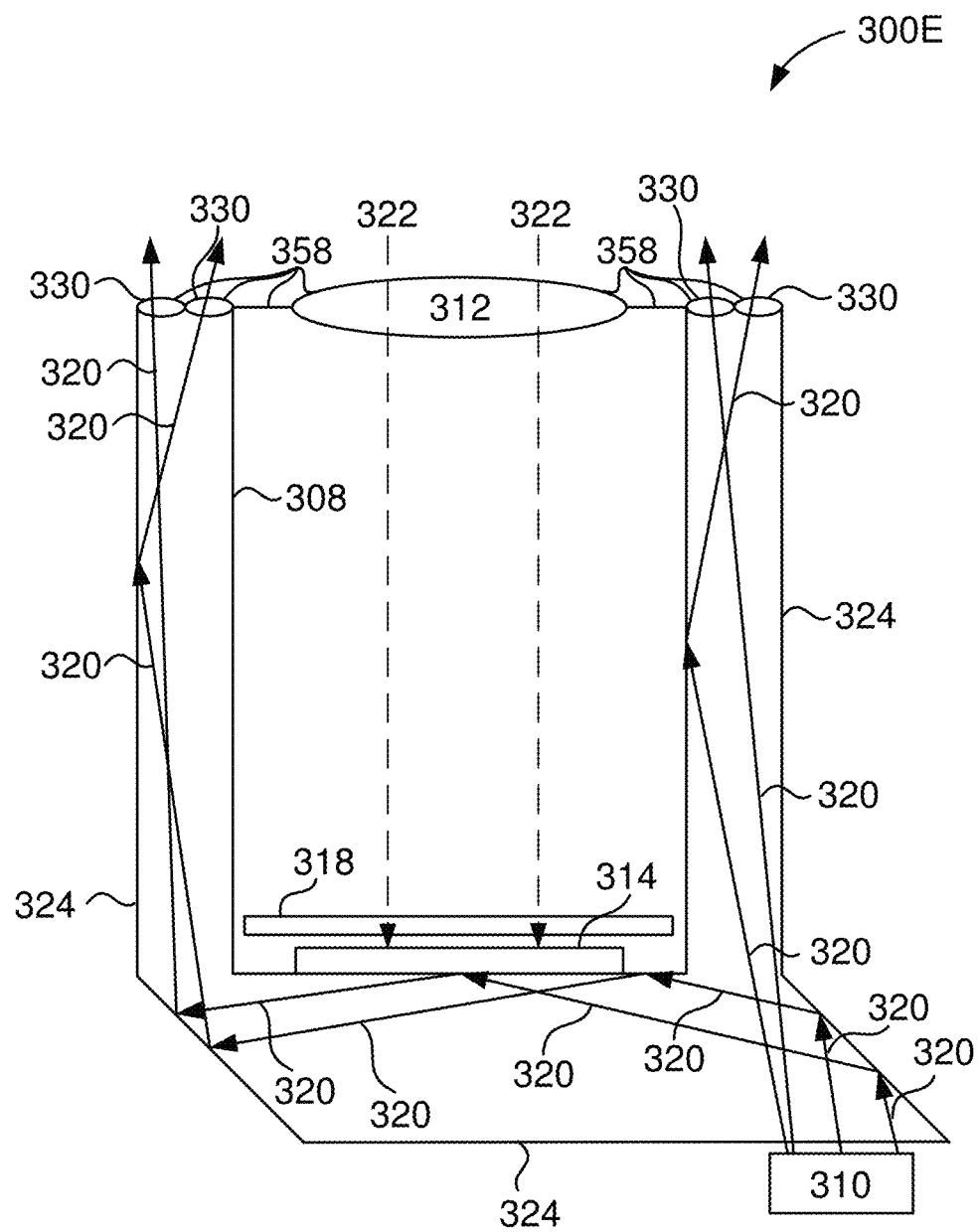
FIG. 3E shows an example camera assembly, in accordance with some embodiments.

FIG. 3E shows an example camera assembly 300E, in accordance with some embodiments. The camera assembly 300E may be an embodiment of the camera assembly 300A, 300B, 300C, and/or 300D described above with reference to FIGS. 3A-3D. As shown in FIG. 3E, the light guide 324 includes two micro-lenses 330 disposed on either side of the housing 308. In some embodiments, more than two micro-lenses 330 may be disposed on either side of the housing 308, along the surface of the light guide 324 that forms a ring around the housing 308. The micro-lenses 330 may be configured to diffuse and/or diffract light emitted by the light source 310.

Figure 3F:
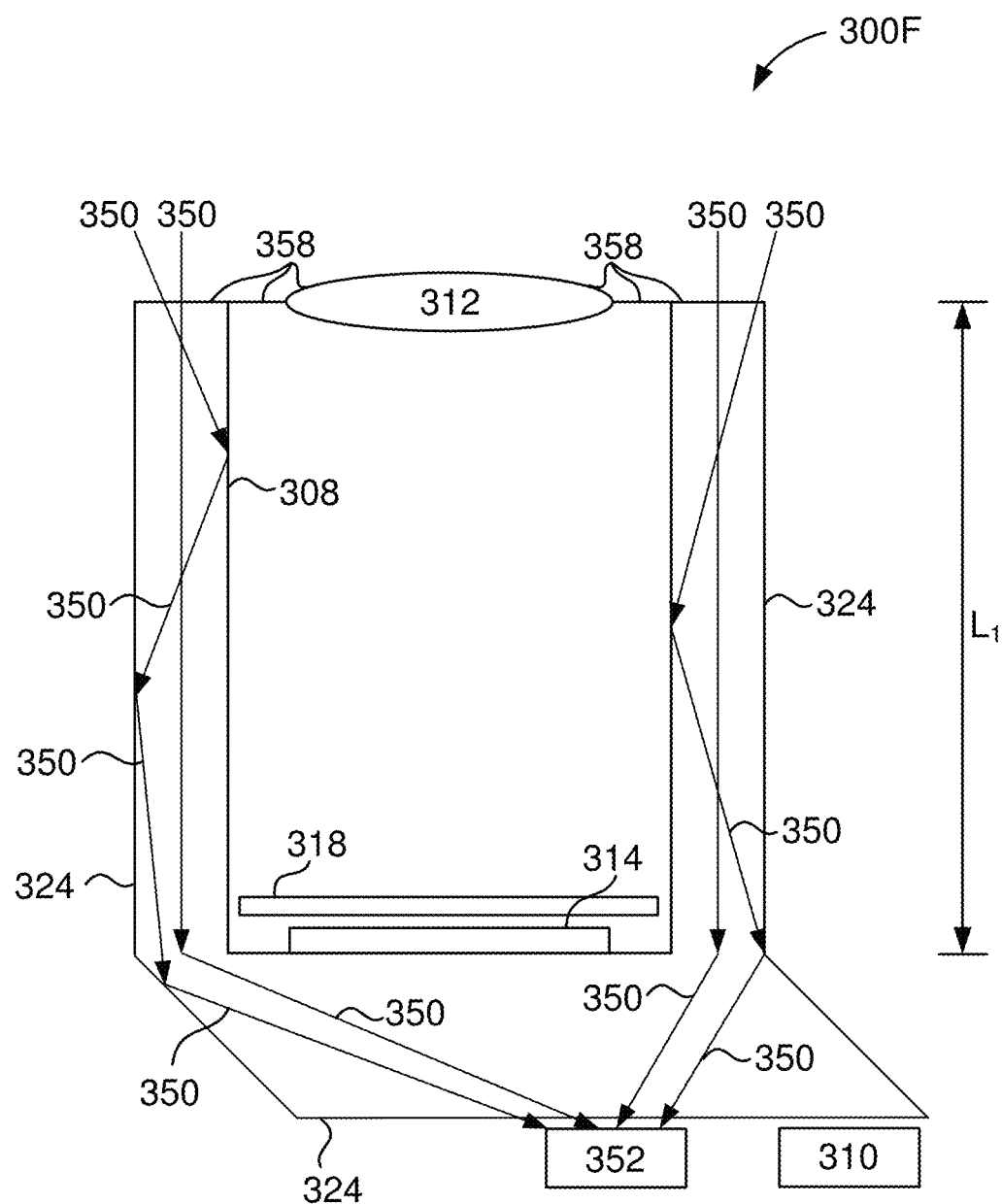
FIG. 3F shows an example camera assembly, in accordance with some embodiments.

FIG. 3F shows an example camera assembly 300F, in accordance with some embodiments. The camera assembly 300F may be an embodiment of the camera assembly 300A, 300B, 300C, 300D and/or 300E described above with reference to FIGS. 3A-3E. In some embodiments, the camera assembly 300F may include ambient light sensor 352. The ambient light sensor 352 may be configured to detect an amount of ambient light in front of the camera assembly 300F. During sensing, ambient light 350 in front of the camera assembly 300F may be guided through the light guide 324 to the ambient light sensor 352. Accordingly, the camera assembly 300F may be capable of measuring ambient light in order to, for example, adjust the brightness of a display screen coupled to the camera assembly 300F.

Figure 3G:
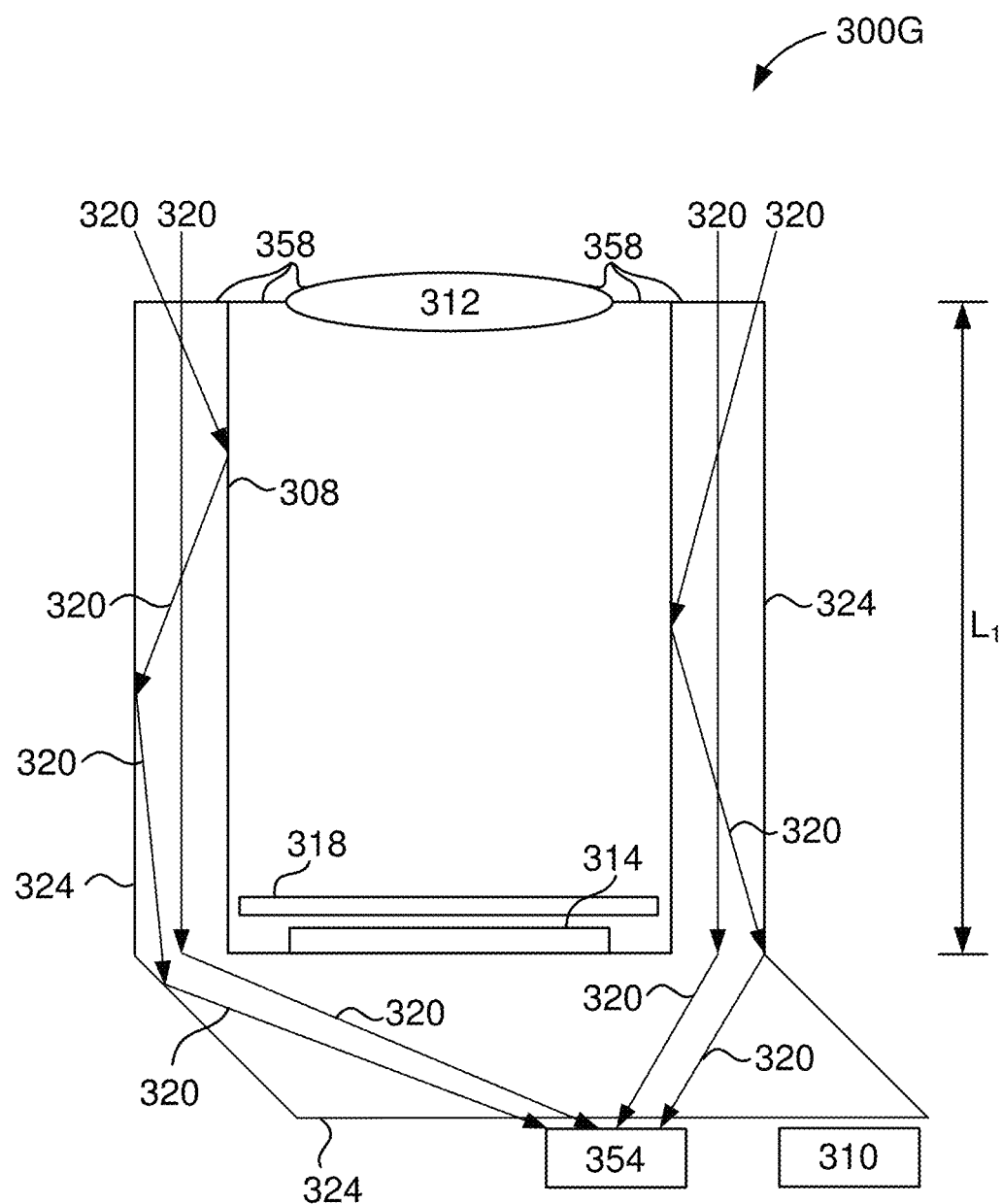
FIG. 3G shows an example camera assembly, in accordance with some embodiments.

FIG. 3G shows an example camera assembly 300G, in accordance with some embodiments. The camera assembly 300G may be an embodiment of the camera assembly 300A, 300B, 300C, 300D, 300E, and/or 300F described above with reference to FIGS. 3A-3F.

As shown in FIG. 3G, the camera assembly 300G includes the light guide 324, which may be configured to reflect light. In some embodiments, the light guide 324 may be configured to reflect light where interior surfaces of the light guide 324 have a refractive index that is greater than a refractive index of interior surfaces of the housing 308.

Further, in some embodiments, the light guide 324 may be configured to reflect light where interior surfaces of the light guide 324 comprise reflective surfaces while interior surfaces of the housing 308 comprise dark surfaces or surfaces capable of absorbing visible or IR (e.g., NIR and/or SWIR) light.

In some embodiments, the camera assembly 300G may include proximity sensor 354. The proximity sensor 354 may be configured to detect IR (e.g., NIR or SWIR) light 320 emitted by the light source 310. During sensing, the light source 310 may emit the IR light 320, which may be guided through the light guide 324 to the front of the camera assembly 300G (emitted IR light 320 not shown for simplicity). Some of the IR light 320 may reflect off an object or feature in front of the camera assembly 300G and travel back through the light guide 324 to the proximity sensor 354. Accordingly, the camera assembly 300G may be capable of emitting and sensing IR light in order to, for example, detect a user's presence.

FIGS. 4A-4K show example electronic systems 400A-400K, in accordance with some embodiments. Each of the electronic systems 400A-400K includes a camera assembly 432, cameras 402 and/or 404, and display 406. The camera assembly 432 may be an embodiment of the camera assembly 200 and/or 300A-300G in FIGS. 2 and 3A-3G. Each of the cameras 402 and 404 may be an embodiment of the camera 102 and/or 104 of FIG. 1. Further, each of the cameras 402 and 404 may be disposed below the display 406 and be configured to capture images for depth sensing.

Figure 4A:
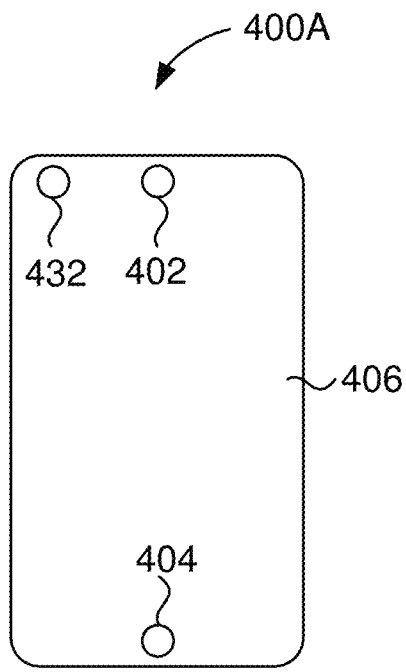
FIGS. 4A-4K show example electronic systems, in accordance with some embodiments.

As shown in FIG. 4A, the camera assembly 432 is disposed near a corner of the electronic system 400A, and the cameras 402 and 404 are disposed toward the ends of electronic system 400A, along the long axis.

During operation, IR (e.g., NIR or SWIR) light may be emitted by a light source of the camera assembly 432 to illuminate a scene in front of the camera assembly 432. Objects in the scene may reflect at least a portion of the IR light back towards the camera assembly 432 and display 406. Some of the reflected IR light may pass through holes between pixels and/or sub-pixels of the display 406, and be detected by the IR cameras 402 and 404 disposed behind the display 406. Each of the cameras 402 and 404 may capture the detected IR light in an image, and the captured images may be suitable for depth sensing.

Figure 4B:
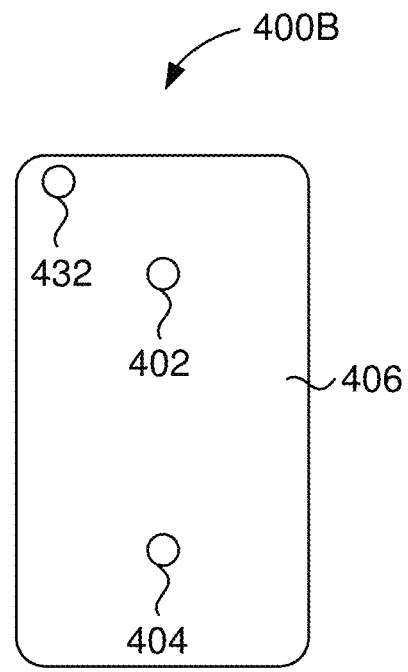

In FIG. 4B, the camera assembly 432 is disposed near a corner of the electronic system 400B, and the cameras 402 and 404 are disposed near the mid-region of the electronic system 400B, along the long axis. As discussed above with reference to FIG. 1, the distance of separation between two cameras impacts the resolution of depth sensing. In other words, the greater the distance between the cameras, the greater the amount of depth information that can be derived from images captured by the cameras. In contrast to FIG. 4A, the cameras 402 and 404 of FIG. 4B are separated by a smaller distance. As a result, the cameras 402 and 404 of FIG. 4A may support a higher resolution of depth sensing than the cameras 402 and 404 of FIG. 4B.

Figure 4C:
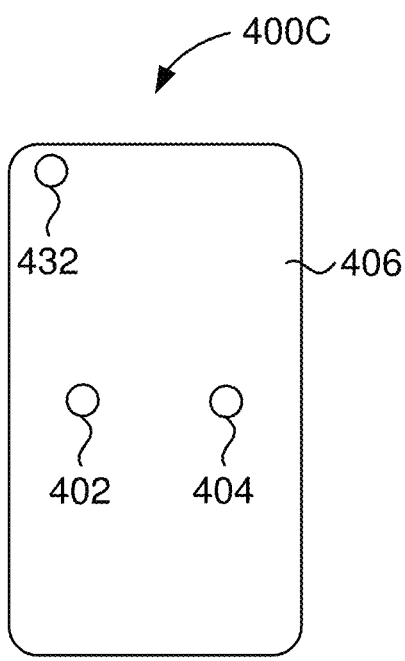
Figure 4D:
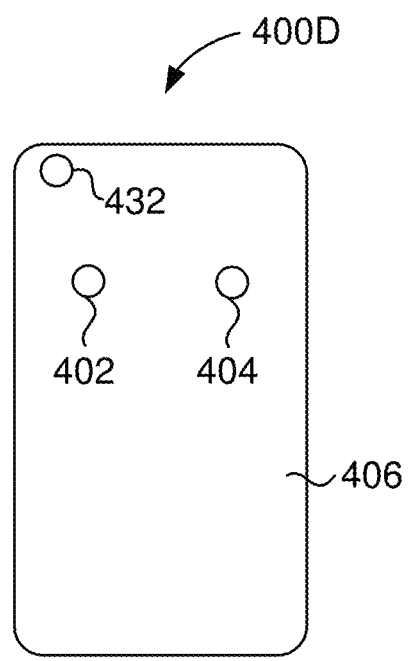

FIG. 4C shows the camera assembly 432 disposed near a corner of the electronic system 400C, and the cameras 402 and 404 disposed toward the mid-region of the electronic system 400C, along the short axis. FIG. 4D shows the camera assembly 432 disposed near a corner of the electronic system 400D, and the cameras 402 and 404 disposed in the upper portion of the electronic system 400D, along the short axis.

Figure 4E:
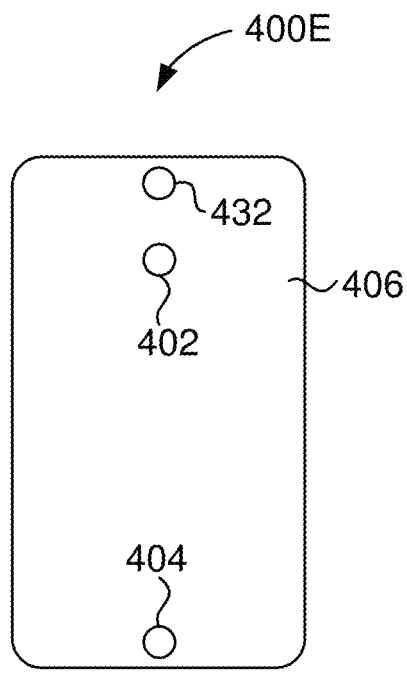
Figure 4F:
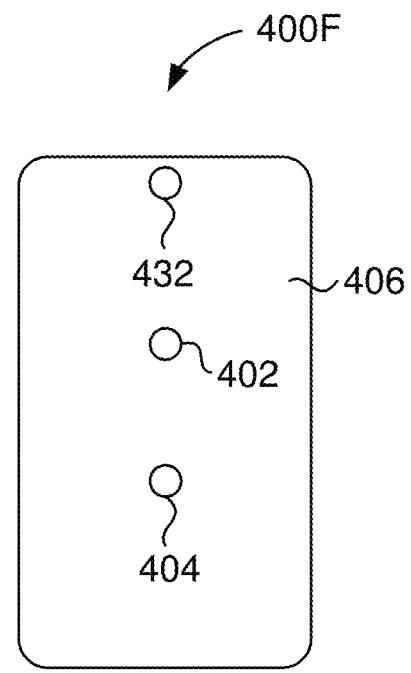

FIG. 4E shows the camera assembly 432 disposed near one end of the electronic system 400E. The cameras 402 and 404 are disposed along the long axis, in alignment with the camera assembly 432. In FIG. 4F, the camera assembly 432 is disposed near one end of the electronic system 400F. The cameras 402 and 404 are disposed along the long axis, in alignment with the camera assembly 432. In contrast to FIG. 4E, the cameras 402 and 404 of FIG. 4F are separated by a smaller distance. As a result, the cameras 402 and 404 of FIG. 4E may support a higher resolution of depth sensing than the cameras 402 and 404 of FIG. F.

Figure 4G:
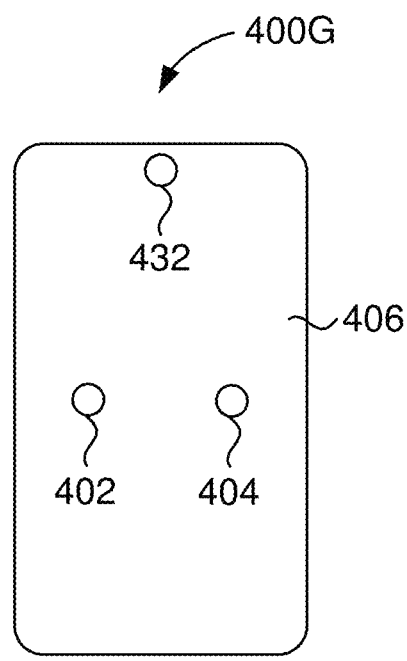

FIG. 4G shows the camera assembly 432 disposed near one end of the electronic system 400G. The cameras 402 and 404 are disposed toward the mid-region of the electronic system 400G, along the short axis.

Figure 4H:
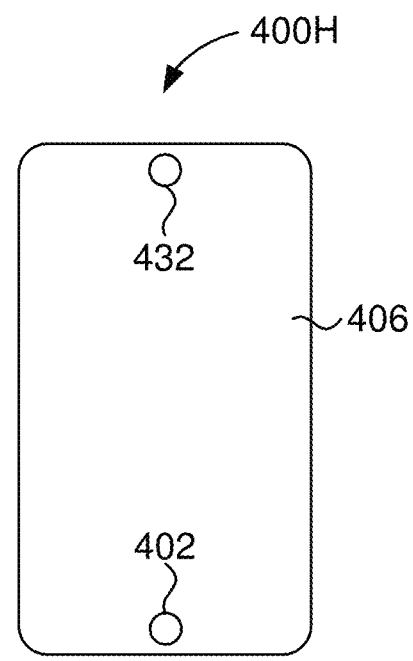

FIG. 4H shows the camera assembly 432 disposed near one end of the electronic system 400H and the camera 402 disposed near the opposite end of the electronic system 400H. In some embodiments, both the camera assembly 432 and the camera 402 may be configured to capture images for depth sensing.

Figure 4I:
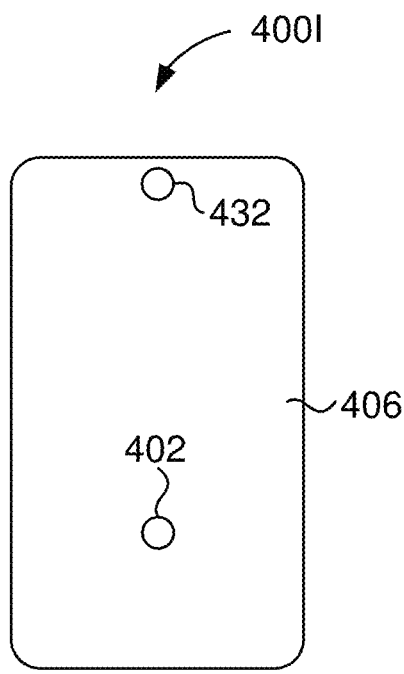

FIG. 4I shows the camera assembly 432 disposed near one end of the electronic system 400I and the camera 402 disposed near the mid-region of the electronic system 400I. In some embodiments, both the camera assembly 432 and the camera 402 may be configured to capture images for depth sensing.

Figure 4J:
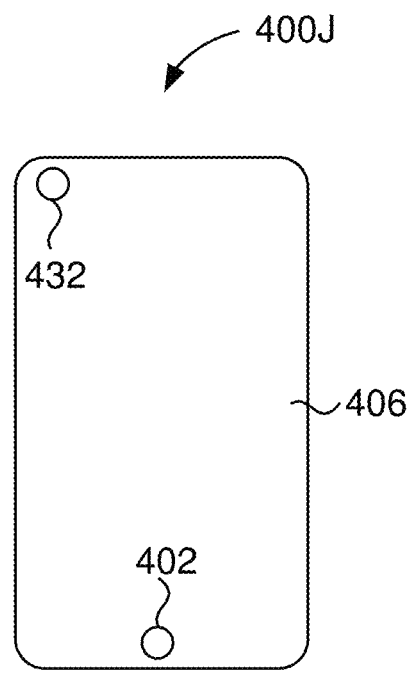

FIG. 4J shows the camera assembly 432 disposed near one corner of the electronic device 400J and the camera 402 disposed near an end of the electronic device 400J. In some embodiments, both the camera assembly 432 and the camera 402 may be configured to capture images for depth sensing.

Figure 4K:
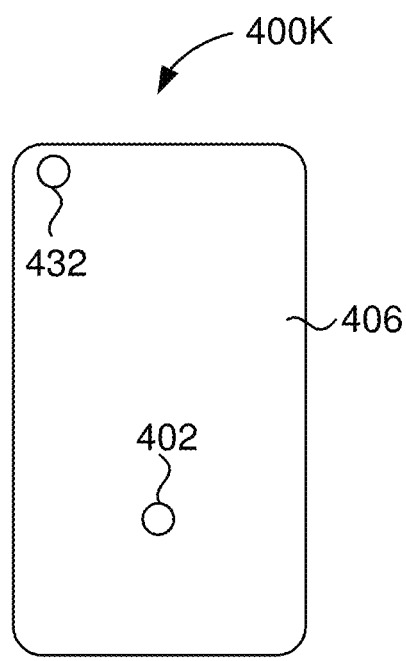

FIG. 4K shows the camera assembly 432 disposed near one corner of the electronic system 400K and the camera 402 disposed near the mid-region of the electronic system 400K. In some embodiments, both the camera assembly 432 and the camera 402 may be configured to capture images for depth sensing.

Figure 5:
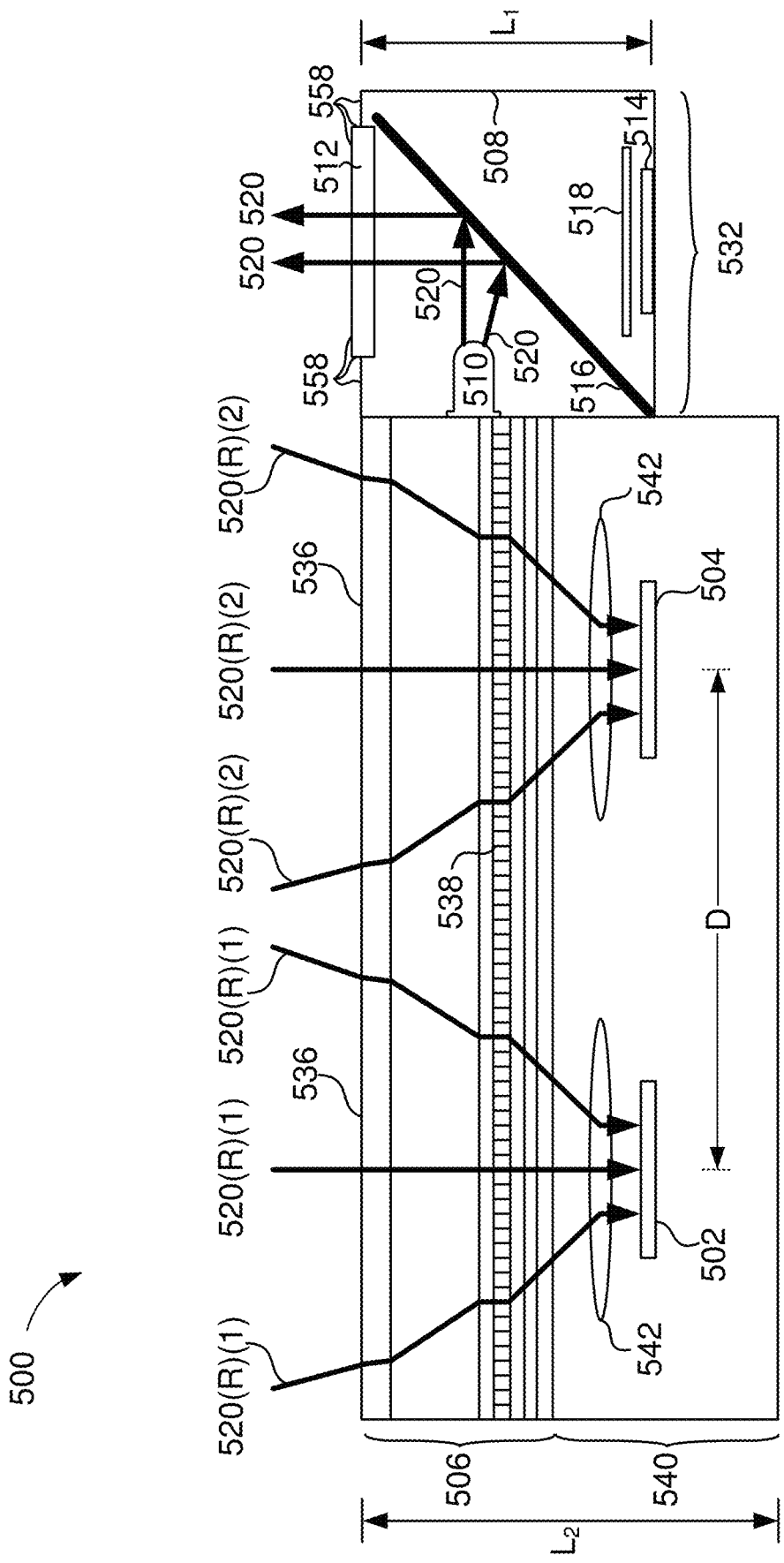
FIG. 5 shows a cross-section of an example electronic system, in accordance with some embodiments.

FIG. 5 shows a cross-section of an example electronic system 500, in accordance with some embodiments. The electronic system 500 may be an embodiment of the electronic system 100 and/or 400A-400G in FIGS. 1 and 4A-4G. As shown in FIG. 5, the electronic system 500 includes the camera assembly 532, display layers 506, and module 540. The camera assembly 532 may be an embodiment of the camera assembly 200 and/or 432 of FIGS. 2 and 4A-4G. The module 540 includes the cameras 502 and 504, each of which may be an embodiment of the cameras 102, 104, 402 and/or 404 of FIGS. 1 and 4A-4G.

The camera assembly 532 includes light source 510, reflector 516, lens 512, camera 514, filter 518, and housing 508. Further, the length $L_1$ is the length of the housing 508, as measured from the top of the housing 508, at the first surface 558, to the base of the housing 508, near the camera 514. In some embodiments, it may be advantageous to minimize the length $L_1$ of the housing 508. Further, while the length $L_1$ appears to be shorter than the length $L_2$ (which spans the length of the display layers 506 and module 540), $L_1$ may be nearly any length shorter than, equal to, or longer than length $L_2$. In addition, while the camera assembly 532 is shown adjacent to the display layers 506 and module 540, in actual implementations, components (not shown) may separate the camera assembly 532 from the display layers 506 and module 540.

The display layers 506 may comprise a plurality of layers of a porous display, such as an OLED display or a micro-LED display. As shown in FIG. 5, the display layers 506 may include a display surface 536 and emissive layer 538. In some embodiments, the emissive layer 538 may include a plurality of display pixels and/or display sub-pixels, with holes, gaps, or empty space between each of the display pixels and/or display sub-pixels.

The module 540 is disposed below the display layers 506, and may include the cameras 502 and 504 and corresponding lenses 542. The cameras 502 and 504 may comprise IR CMOS sensors configured for wide-range imaging, where an object or scene is imaged either close up or far away. The cameras 502 and 504 may be further configured to rapidly sense objects such as fingers, hands, and heads. Further, each of the cameras 502 and 504 may be configured to capture images for depth sensing. The resolution of the depth sensing may depend on the distance of separation D between the cameras 502 and 504. In other words, the greater the distance D, the greater the amount of depth information that can be derived from images captured by the cameras 502 and 504.

During operation, the light source 510 may emit IR (e.g., NIR or SWIR) light 520, which reflects off the reflector 516 and passes through the lens 512. The IR light 520 may illuminate a scene in front of the camera assembly 532 and the cameras 502 and 504. Objects in the scene may reflect at least a portion of the IR light 520 back towards the display layers 506, for example, as reflected light 520(R)(1) and 520(R)(2). Some of the reflected light 520(R)(1) and 520(R)(2) may be occluded by display pixels and/or display sub-pixels in the emissive layer 538, while the remainder of the reflected light 520(R)(1) and 520 (R)(2) passes through the holes between the display pixels and/or display sub-pixels. The reflected light 520(R)(1) and 520(R)(2) that passes though the holes and lenses 542 may be detected by the cameras 502 and 504, respectively. Each of the cameras 502 and 504 may capture their respective reflected IR light as a separate image, and these images may be combined for depth sensing.

Figure 6:
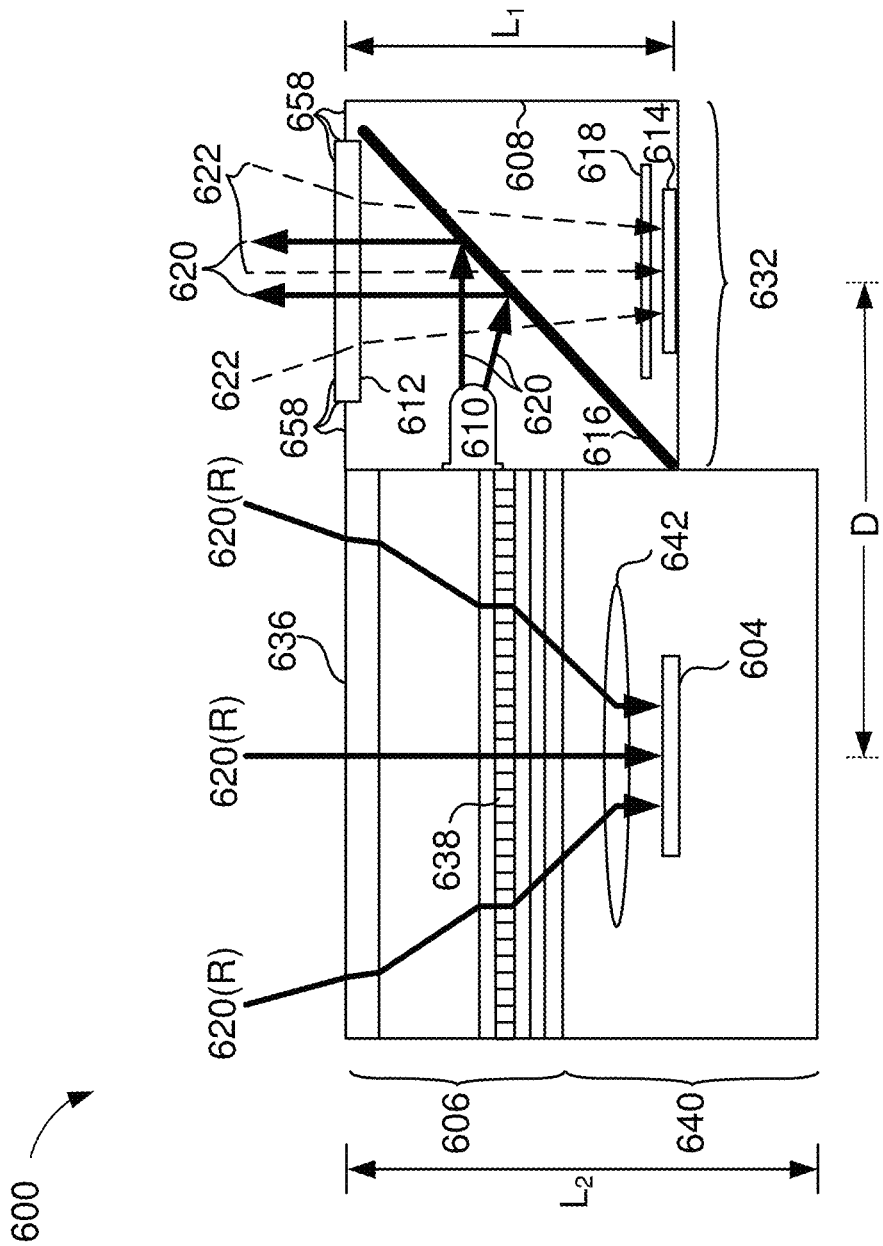
FIG. 6 shows a cross-section of an example electronic system, in accordance with some embodiments.

FIG. 6 shows a cross-section of an example electronic system 600, in accordance with some embodiments. The electronic system 600 may be an embodiment of any of the electronic systems 400H-400K in FIGS. 4H-4K. As shown in FIG. 6, the electronic system 600 includes the camera assembly 632, display layers 606, and module 640. The camera assembly 632 may be an embodiment of the camera assembly 200, 432, and/or 532 of FIGS. 2, 4A-4K, and 5. The display layers 606 may be an embodiment of the display layers 506 in FIG. 5. As shown in FIG. 6, the module 640 includes the camera 604, which may be an embodiment of the camera 102, 104, 402, 404, 502 and/or 504 of FIGS. 1 and 4A-4K, and 5.

During operation, the light source 610 may emit IR (e.g., NIR or SWIR) light 620, which reflects off the reflector 616 and passes through the lens 612. The IR light 620 may illuminate a scene in front of the camera assembly 632 and camera 604. Objects in the scene may reflect at least a portion of the IR light 620 back towards the display layers 606, for example, as reflected light 620(R). Some of the reflected light 620(R) may pass through the display layers 606 and lens 642, be detected by the camera 604, and captured as an image. In some embodiments, at substantially the same time that the light source 610 emits the IR light 620, the camera 614 may detect visible light 622 (e.g., from the sun or another light source) that reflects off the objects in the scene and capture the visible light 622 in an image. The images captured by the cameras 614 and 604 may be combined for depth sensing.

Figure 7:
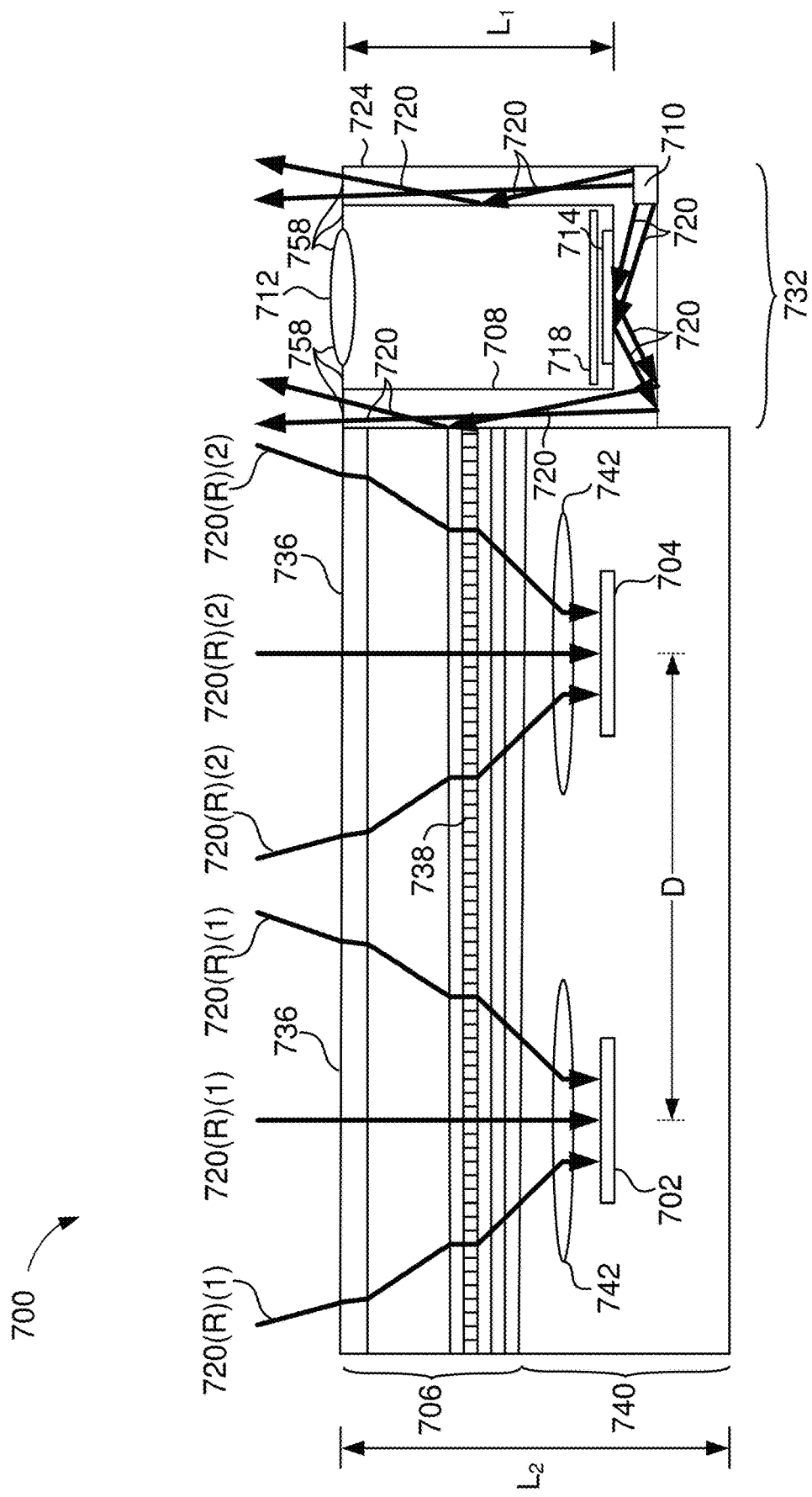
FIG. 7 shows a cross-section of an example electronic system, in accordance with some embodiments.

FIG. 7 shows a cross-section of an example electronic system 700, in accordance with some embodiments. The electronic system 700 may be an embodiment of electronic system 100 and/or 400A-400G in FIGS. 1 and 4A-4G. As shown in FIG. 7, the electronic system 700 includes the camera assembly 732, display layers 706, and module 740. The camera assembly 732 may be an embodiment of the camera assembly 300A and/or any of the camera assemblies 300B-300G in FIGS. 3A-3G. The display layers 706 may be an embodiment of the display layers 506 and/or 606 in FIGS. 5 and 6. Further, the module 740 may be an embodiment of the module 540 of FIG. 5.

The camera assembly 732 includes light source 710, light guide 724, lens 712, camera 714, filter 718, and housing 708. In some embodiments, the camera assembly 732 may further include additional light sources, a diffuse surface, microlenses, an ambient sensor, and/or a proximity sensor, as shown in FIGS. 3B-3G.

The length $L_1$ is the length of the housing 708, as measured from the top of the housing 708, at the first surface 758, to the base of the housing 708, near the camera 714. In some embodiments, it may be advantageous to minimize the length $L_1$ of the housing 708. Further, while the length $L_1$ appears to be shorter than the length $L_2$ (which spans the length of the display layers 706 and module 740), $L_1$ may be nearly any length shorter than, equal to, or longer than length $L_2$. In addition, while the camera assembly 732 is shown adjacent to the display layers 706 and module 740, in actual implementations, components (not shown) may separate the camera assembly 732 from the display layers 706 and module 740.

During operation, the light source 710 may emit IR (e.g., NIR or SWIR) light 720, which is steered through the light guide 724 and first surface 758. The IR light 720 may illuminate a scene in front of the cameras 702, 704 and 714. Objects in the scene may reflect at least a portion of the IR light 720 back towards the display layers 706, for example, as reflected IR light 720(R)(1) and 720(R)(2). Some of the reflected IR light 720(R)(1) and 720(R)(2) may pass through the display layers 706 and lenses 742, and be detected by the cameras 702 and 704, respectively. Each of the cameras 702 and 704 may capture their respective IR light as a separate image, and these images may be combined for depth sensing.

Figure 8:
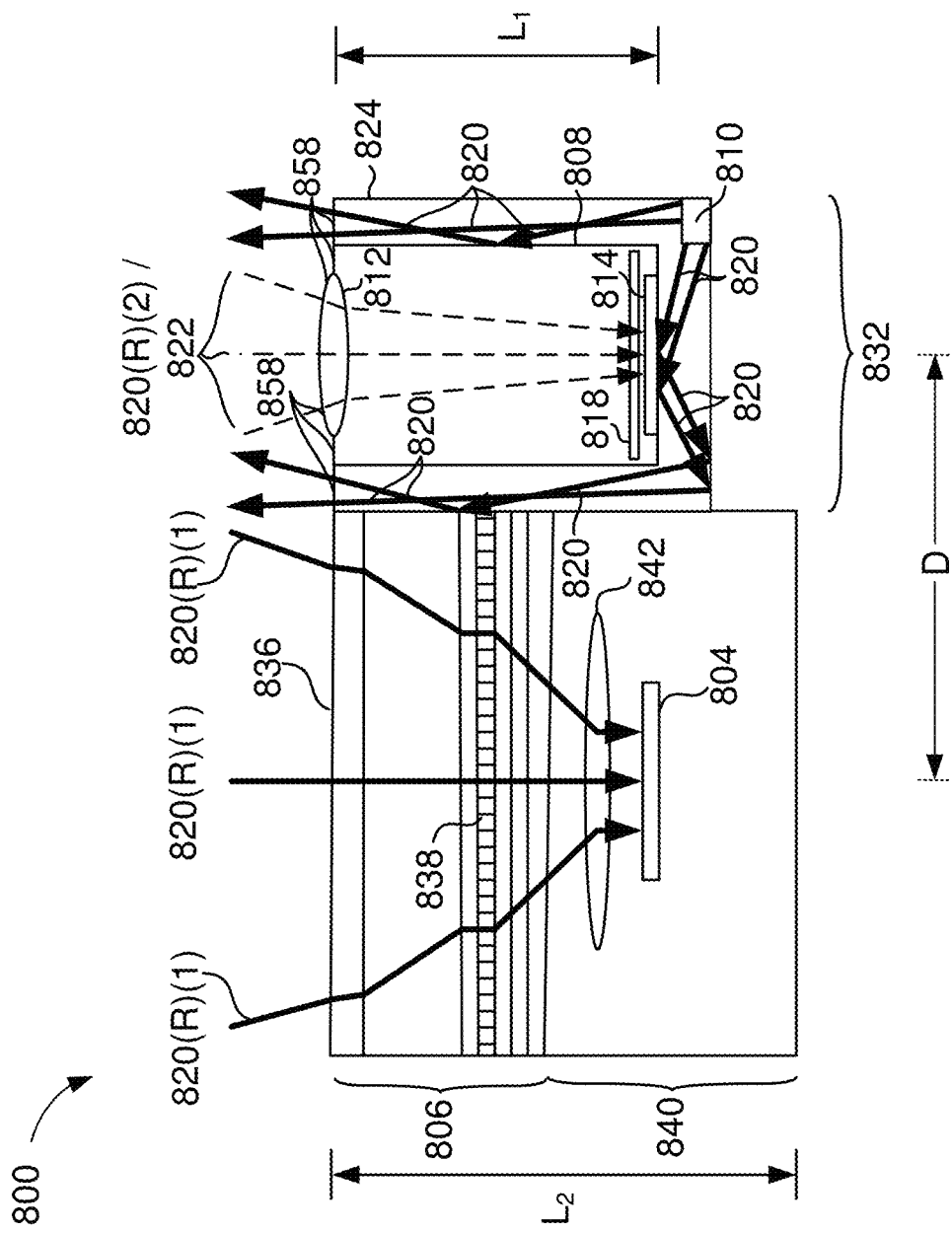
FIG. 8 shows a cross-section of an example electronic system, in accordance with some embodiments.

FIG. 8 shows a cross-section of an example electronic system 800, in accordance with some embodiments. The electronic system 800 may be an embodiment of any of the electronic systems 400H-400K in FIGS. 4H-4K. As shown in FIG. 8, the electronic system 800 includes the camera assembly 832, display layers 806, and module 840. The camera assembly 832 may be an embodiment of the camera assembly 300A and/or any of the camera assemblies 300B-300G in FIGS. 3A-3G. The display layers 806 may be an embodiment of the display layers 506, 606 and/or 706 in FIGS. 5-7. Further, the module 840 includes camera 804, which may be an embodiment of the camera 102, 104, 402, 404, 502, 504, 604, 702, and/or 704 in FIGS. 1, 4A-4K, and 5-7. In some embodiments, the camera 804 may be configured to detect IR (e.g., NIR or SWIR) light, and the filter 818 may be configured to shield the camera 804 from visible light.

During operation, the light source 810 may emit IR (e.g., NIR or SWIR) light 820, which is steered through the light guide 824 and first surface 858. The IR light 820 may illuminate a scene in front of the cameras 804 and 814. Objects in the scene may reflect at least a portion of the IR light 820 back towards the camera assembly 800 and display layers 806, for example, as reflected IR light 820(R)(1) and 820(R)(2). Some of the reflected IR light 820(R)(1) may pass through the display layers 806 and lens 842, be detected by the camera 804, and captured as an image. Further, some of the reflected light 820(R)(2) may pass through the lens 812 and filter 818 to the camera 814, which may capture the reflected light 820(R)(2) in an image. Each of the images captured by the cameras 804 and 814 may be combined for depth sensing.

In some embodiments, the camera 814 may be configured to detect visible light, and the filter 818 may be configured to shield the camera 814 from IR light. During operation, the light source 810 may emit IR (e.g., NIR or SWIR) light 820, which is steered through the light guide 824 and first surface 858. The IR light 820 may illuminate a scene in front of the cameras 804 and 814. Objects in the scene may reflect at least a portion of the IR light 820(R)(1) back towards the display layers 806, for example, as reflected light 820(R)(1). Some of the reflected light 820(R)(1) may pass through the display layers 806 and lens 842, be detected by the camera 804, and captured as an image. In some embodiments, at substantially the same time that the light source 810 emits the IR light 820, the camera 814 may detect visible light 822 (e.g., from the sun or another light source) that reflects off the objects in the scene, and capture the visible light 822 in an image. Each of the images captured by the cameras 814 and 804 may be combined for depth sensing.

Figure 9:
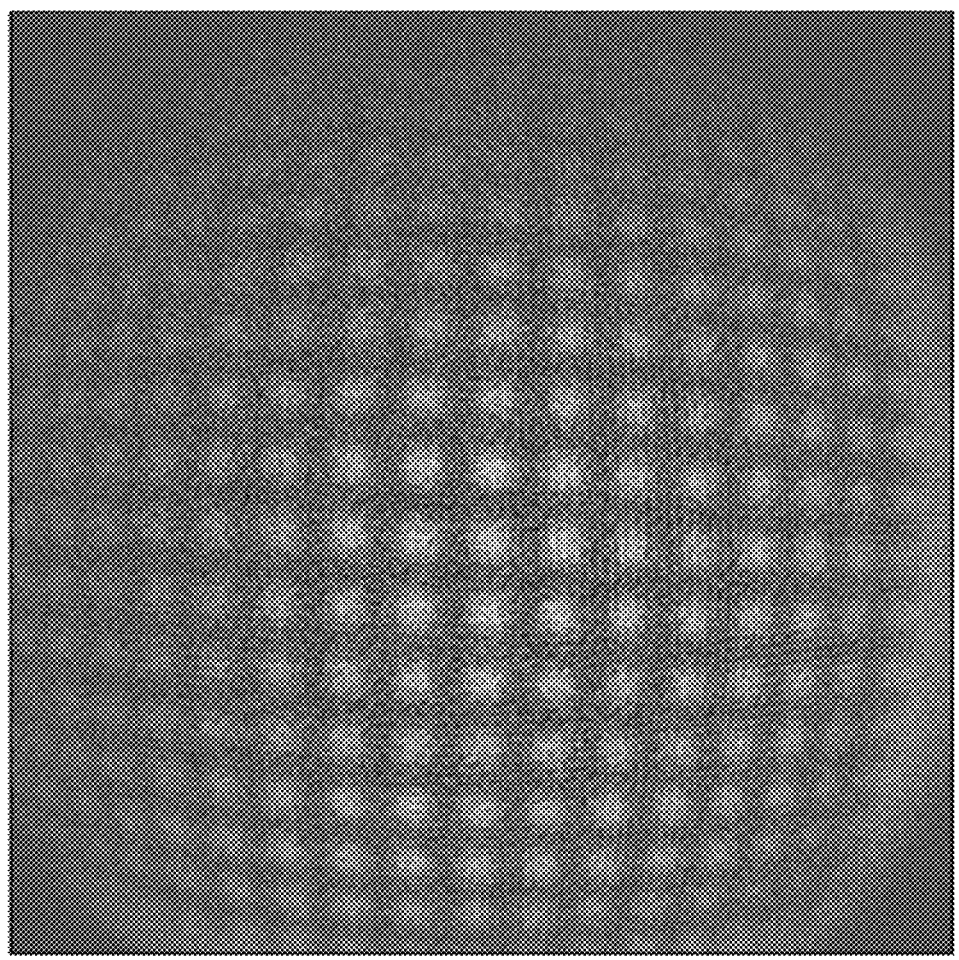
FIG. 9 shows an example image captured by a camera disposed under a display, in accordance with some embodiments.

FIG. 9 shows an example image 900 captured by a camera disposed under a display, in accordance with some embodiments. The image 900 may be captured by a camera disposed behind or beneath a porous display such as, for example, the camera 102, 104, 402, 404, 502, 504, 604, 702, 704, or 804 of FIGS. 1, 4A-4K, and 5-8. As shown in FIG. 9, the image 900 includes a grid of dark lines and light dots—or a "screen door effect." The dark lines correspond to a pattern of display pixels and/or display sub-pixels, and are produced by the display pixels and/or display sub-pixels blocking some light from passing through the display. In contrast, the brighter dots correspond to gaps or holes between the display pixels and/or display sub-pixels. The bright dots are produced by light passing through the holes or gaps in the display to the camera below.

In some embodiments, an image captured by an under-display camera may include a grid or screen door effect that appears as though the under-display camera is simultaneously imaging through multiple layers of screen doors (or a stack of screen doors), where each screen door layer has a different pitch (i.e. hole-size or density). In such embodiments, light may pass through holes or gaps between display pixels and/or display sub-pixels of the screen door layers. Further, each point of light is spread horizontally and vertically into a different position (i.e., as a point spread function), and each point of IR light is spread in a similar fashion across the image, which may result in significant distortion.

As shown in FIG. 9, portions of the image 900 are obfuscated by the pixels and/or sub-pixels of the display. In other words, the display pixels and/or display sub-pixels may reduce the amount of light available for sensing, and effectively obstruct the FOV of the under-display camera. Thus, in some embodiments, the captured images may be filtered or calibrated in order to eliminate the screen door effect, distortion, or other artifacts.

Figure 10:
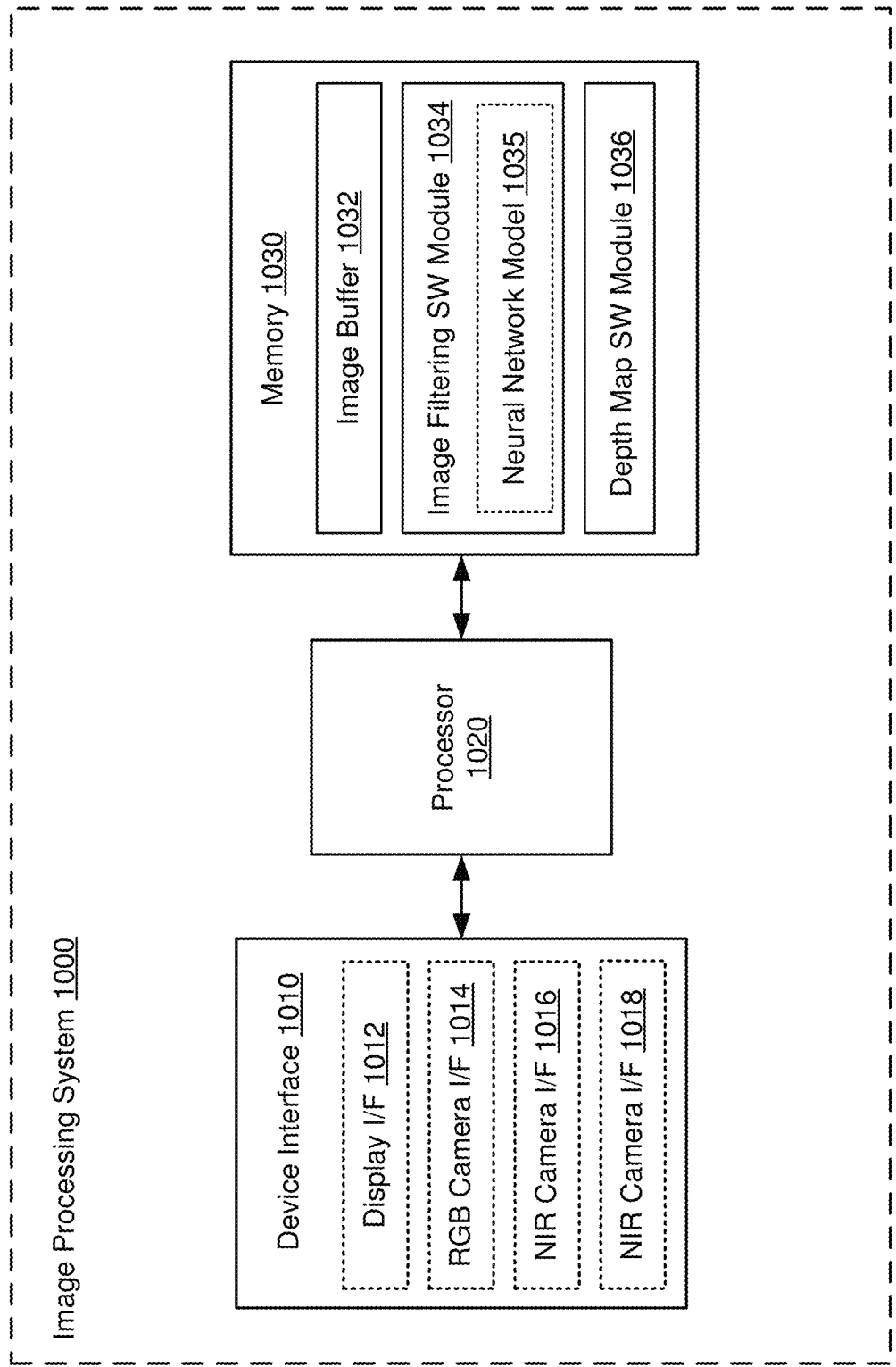
FIG. 10 shows a block diagram of an example image processing system, in accordance with some embodiments.

FIG. 10 shows a block diagram of an image processing system 1000, in accordance with some embodiments. The image processing system 1000 includes a device interface 1010, a processor 1020, and a memory 1030. For purposes of discussion herein, the processor 1020 is shown as being coupled to the device interface 1010 and the memory 1030. For actual embodiments, the device interface 1010, the processor 1020, and/or the memory 1030 may be connected together using one or more buses (not shown for simplicity). In some embodiments, the image processing system 1000 may be an application specific integrated circuit (ASIC) or other integrated circuit (IC) of the electronic system 100, 400A-400K, and/or 500-800 of FIGS. 1, 4A-4K, and 5-8.

The device interface 1010 may transmit and receive signals to and from input devices including, but not limited to, one or more cameras, camera assemblies, and/or a display. In some embodiments, the device interface 1010 may include the display interface 1012. The display interface 1012 may be used to communicate with a display and/or to provide a visual interface to a user of the image processing system 1000. In some embodiments, the device interface 1010 may further include RGB camera interface 1014 and IR camera interfaces 1016 and 1018. Each camera interface 1014, 1016, and 1018 may be used to communicate with a different camera. For example, the RGB camera interface 1014 may transmit activation signals to, and receive sensor information from, the camera 514 or 714 to capture an image of an object or scene. Further, each of the IR camera interfaces 1016 and 1018 may transmit activation signals to, and receive sensor information from, for example, the camera 502, 504, 702 or 704 to capture IR images of an object and/or scene.

The memory 1030 may include an image buffer 1032 to store images received via the camera interfaces 1014, 1016, and/or 1018. The memory 1030 may also include a non-transitory computer-readable medium (e.g., one or more nonvolatile memory elements, such as EPROM, EEPROM, flash memory, a hard drive, and so on) that may store at least the following SW modules:

- an image filtering SW module 1034 to filter images received via the IR camera interfaces 1016 and/or 1018 (or other interfaces that communicate with under-display cameras), the image filtering SW module 1034 further including:
  - a neural network model 1035 to filter, reduce, or eliminate noise from images received via the IR camera interfaces 1016 and/or 1018; and
- a depth map SW module (or depth map generator) 1036 to combine images received via (i) both of the IR camera interfaces 1016 and 1018 or (ii) the RGB camera interface 1014 and either the IR camera interface 1016 or 1018, and to extract depth information from the images using, for example, stereopsis.

Each software module includes instructions that, when executed by processor 1020, cause the image processing system 1000 to perform the corresponding functions.

For example, the processor 1020 may execute the image filtering SW module 1034 to filter images received via the IR camera interfaces 1016 and/or 1018. In executing the image filtering SW module 1034, the processor 1020 may use the neural network model 1035 to filter, reduce, or eliminate noise (such as a screen door effect) from images received via the IR camera interfaces 1016 and/or 1018. The processor 1020 may further execute the depth map SW module 1036 to determine depth information for objects or features in the filtered images. For example, a depth map generator may use stereopsis to combine the filtered images and extract depth information from the combined, filtered images. The depth map generator may further generate a depth map of the objects or features based at least in part on the extracted depth information. Further, the processor 1020 may also authenticate subjects, objects or features in images based, at least in part, on the depth information.

As described above with respect to FIGS. 9 and 10, images captured by under-display cameras may include a screen door effect, or other noise, distortion or interference. Aspects of the present disclosure recognize that the screen door effect occurs where light (e.g., reflected IR, NIR or SWIR light) passes through a display, and some of the light is occluded by pixels and/or sub-pixels of the display, while the remaining light passes through holes between the pixels and/or sub-pixels and is captured by an under-display camera in an image. To facilitate depth sensing or other applications, an image filter may use a neural network model to filter out the screen door effect from the image.

Figure 11B:
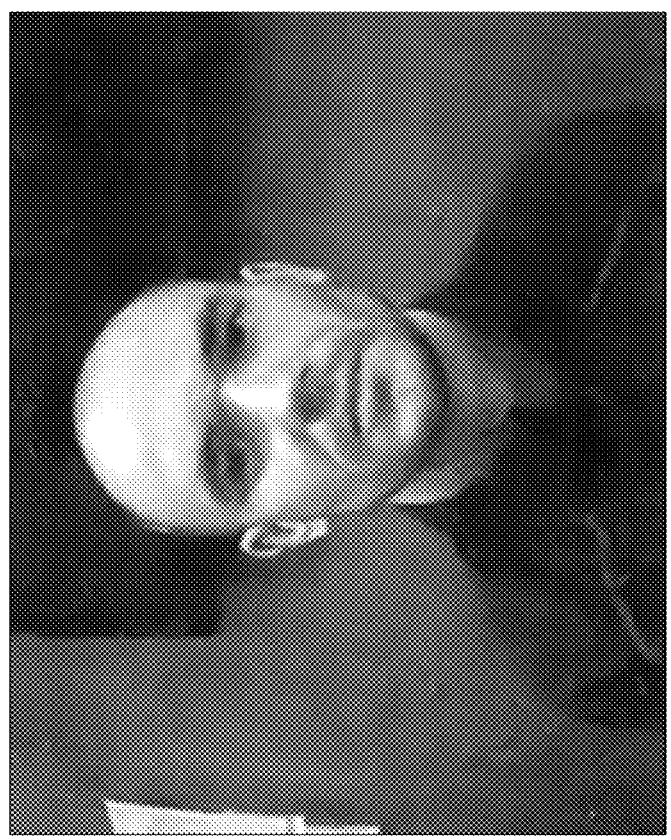
FIG. 11B shows an example image after filtering.
Figure 11A:
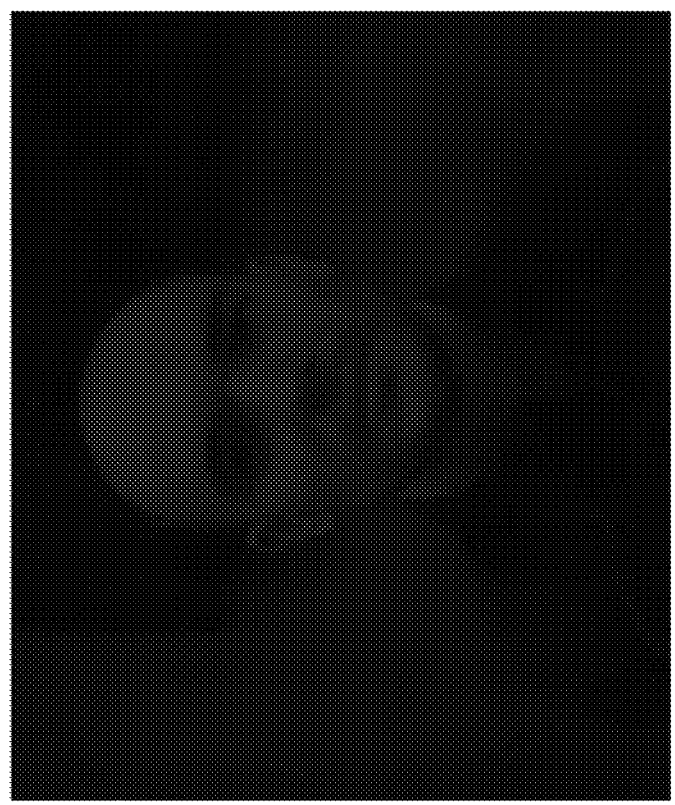
FIG. 11A shows an example image prior to filtering.

FIG. 11A shows an example image 1110 captured by an under-display camera prior to filtering. With reference to FIG. 10, the example image 1110 may be transmitted from an under-display IR camera to, for example, the IR camera interface 1016. The IR camera interface 1016 may then transmit the example image 1110 to the image buffer 1032 for storage. As shown in FIG. 11A, the example image 1110 is obfuscated by the screen door effect. In order to support depth sensing or other applications, the image filtering SW module 1034 may filter the example image 1110 to remove the distortion.

FIG. 11B shows an example image 1120 after filtering. The example image 1120 may be a filtered version of the example image 1110 shown in FIG. 11A. With reference to FIG. 10, the image buffer 1032 may transmit the example image 1110 to the image filtering SW module 1034. The image filtering SW module 1034 may use the neural network model 1035 to filter out the screen door effect from the example image 1110. As shown in FIG. 11B, the filtered image 1120 more clearly shows a person, and may be suitable for depth sensing or other applications.

In some embodiments, the neural network model 1035 may include a CNN trained to filter out the screen door effect or other noise from a captured image. In other words, the CNN may be trained to infer an original or clean image of an object or scene from an obfuscated image of the object or scene. In some embodiments, the CNN may be trained by receiving and processing at least one original image of an object or scene, and at least one obfuscated image of the object or scene. In some embodiments, in lieu of, or in addition to the CNN, a reverse point spread function transform may be used to filter an image. Accordingly, the image filtering SW module 1034 may filter an image from an under-display IR camera using the neural network model 1035 and/or a reverse point spread function transform.

Some captured images (e.g., obfuscated or filtered images) and image content (e.g., depth information, depth maps or authenticated persons, objects, or scenes) may be stored in a secure repository (e.g., in a trusted environment) on the electronic system 100, 400A-400K, and/or 500-800 of FIGS. 1, 4A-4K, and 5-8. The secure repository may be virtually and/or physically partitioned from the rest of the electronic system such that only applications and/or hardware residing within the trusted environment may have access to the data stored in the secure repository. In some aspects, the secure repository may be formed at least in part within the memory 1030. Thus, certain captured images and image content may be stored within the secure repository of the memory 1030 (e.g., within the image buffer 1032).

In some embodiments, the neural network model 1035 may reside, at least in part, within a trusted environment in the electronic system 100, 400A-400K, and/or 500-800 of FIGS. 1, 4A-4K, and 5-8. Placing the neural network model 1035 within the trusted environment enables the neural network model 1035 to perform machine learning (e.g., with a CNN) on protected captured images and image content.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A device comprising:
    a display;
    a first camera including one or more photosensors configured to detect visible light passing, in a first direction, through a first surface separate from the display;
    a light source configured to emit infrared (IR) light, in a second direction opposite the first direction, through the first surface so that the IR light does not pass through the display in the second direction; and
    a second camera disposed behind the display and configured to detect reflections of the IR light passing through the display in the first direction.

2. The device of claim 1, wherein the first surface comprises a lens configured to focus the visible light onto the one or more photosensors.

3. The device of claim 1, further comprising:
    a dichroic reflector configured to transmit the visible light to the one or more photosensors while reflecting the IR light away from the one or more photosensors.

4. The device of claim 1, further comprising:
a light guide configured to steer the IR light towards the first surface, wherein the first surface comprises at least a portion of the light guide.

5. The device of claim 4, wherein the portion of the light guide comprises a diffuse surface configured to diffuse the IR light emitted from the first surface.

6. The device of claim 4, wherein the portion of the light guide comprises a plurality of micro-lenses configured to diffuse the IR light emitted from the first surface.

7. The device of claim 4, wherein the light guide is further configured to steer ambient light emitted from the first surface to an ambient light sensor.

8. The device of claim 4, wherein the light guide is further configured to steer reflections of the IR light emitted from the first surface to a proximity sensor.

9. The device of claim 1, further comprising:
a depth map generator configured to generate depth information about one or more objects in a field-of-view of the second camera based at least in part on the detected reflections of the IR light.

10. The device of claim 9, wherein the depth information is based on the detected reflections of the IR light and the detected visible light.

11. The device of claim 9, further comprising:
a third camera configured to detect reflections of the IR light emitted by the light source, wherein the depth information is based on the reflections of the IR light detected by each of the second and third cameras.

12. The device of claim 11, wherein the third camera is disposed behind the display.

13. A device comprising:
a display;
a lens separate from the display;
one or more photosensors configured to detect visible light passing through the lens in a first direction;
a light source configured to emit near-infrared (NIR) light through the lens in a second direction opposite the first direction so that the NIR light does not pass through the display in the second direction; and
a reflector configured to transmit the visible light to the one or more photosensors while reflecting the NIR light away from the one or more photosensors.

14. The device of claim 13, wherein the lens is configured to focus the visible light onto the one or more photosensors.

15. The device of claim 13, further comprising:
a first camera disposed behind the display and configured to detect reflections of the NIR light passing through the display in the first direction.

16. The device of claim 13, wherein the reflector comprises a reflective plane.

17. The device of claim 13, wherein the reflector comprises a dichroic reflector.

18. The device of claim 13, further comprising:
a proximity sensor configured to detect reflections of the NIR light emitted by the light source.

19. A device comprising:
a display;
one or more photosensors configured to detect visible light or infrared (IR) light passing, in a first direction, through a first surface separate from the display;
a light source configured to emit light, in a second direction opposite the first direction, through the first surface so that the emitted light does not pass through the display in the second direction; and
a light guide configured to steer the emitted light towards the first surface, wherein the first surface comprises at least a portion of the light guide.

20. The device of claim 19, wherein the light emitted by the light source comprises near-infrared (NIR) light, and wherein the portion of the light guide is configured to diffuse the NIR light emitted from the first surface.

21. The device of claim 19, wherein the light emitted by the light source comprises the visible light, and wherein the portion of the light guide is configured to diffuse the visible light emitted from the first surface.

22. The device of claim 19, wherein the light emitted by the light source comprises near-infrared (NIR) light, and wherein the portion of the light guide comprises a diffuser or a plurality of micro-lenses configured to diffuse the NIR light emitted from the first surface.

23. The device of claim 19, wherein the light emitted by the light source comprises the visible light, and wherein the portion of the light guide comprises a diffuser or a plurality of micro-lenses configured to diffuse the visible light emitted from the first surface.

* * * * *